US012333458B2

(12) United States Patent
Akutsu et al.

(10) Patent No.: US 12,333,458 B2
(45) Date of Patent: *Jun. 17, 2025

(54) VISIT ASSISTANCE DEVICE, VISIT ASSISTANCE SYSTEM, VISIT ASSISTANCE METHOD, AND NON-TRANSITORY COMPUTER-READABLE MEDIUM HAVING PROGRAM STORED THEREIN

(71) Applicant: NEC Corporation, Tokyo (JP)

(72) Inventors: Tatsuki Akutsu, Tokyo (JP); Miki Otani, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/387,265

(22) Filed: Nov. 6, 2023

(65) Prior Publication Data
US 2024/0070567 A1 Feb. 29, 2024

Related U.S. Application Data

(63) Continuation of application No. 17/908,604, filed as application No. PCT/JP2020/011775 on Mar. 17, 2020.

(51) Int. Cl.
*G06Q 10/06* (2023.01)
*G06Q 10/10* (2023.01)
*G06V 40/16* (2022.01)

(52) U.S. Cl.
CPC ............ *G06Q 10/06* (2013.01); *G06Q 10/10* (2013.01); *G06V 40/161* (2022.01)

(58) Field of Classification Search
CPC ...... G06Q 10/063; G06Q 10/06; G06Q 10/10; G06V 40/16; G06V 40/161
See application file for complete search history.

(56) References Cited

U.S. PATENT DOCUMENTS 9,984,520 B1 5/2018 Heller et al.
10,573,106 B1* 2/2020 Brady ................ G06V 40/1365
2008/0000966 A1 1/2008 Keiser
(Continued)

FOREIGN PATENT DOCUMENTS

JP 2010-231492 A 10/2010
JP 2012-141699 A 7/2012
(Continued)

OTHER PUBLICATIONS

Karunasena, R., Sandarenu, P., Pinto, M., Athukorala, A., Rodrigo, R., & Jayasekara, P. (2019). DEVI: Open-source human-robot interface for interactive receptionist systems. (Year: 2019).*
(Continued)

*Primary Examiner* — William S Brockington, III

(57) ABSTRACT

A visit assistance device, a visit assistance system, a visit assistance method, and a program are provided that can assist realization of a comfortable visit. A visit assistance device (1) includes a registration unit (2) configured to register a status in a seated condition of a user who is seated in a predetermined space for each user and a display control unit (3) configured to cause a display device installed in an entrance of the space to display the registered status of the user together with information identifying the user.

3 Claims, 21 Drawing Sheets

(56) References Cited

U.S. PATENT DOCUMENTS

| | | | |
|---|---|---|---|
| 2010/0036690 A1 | 2/2010 | Chafle et al. | |
| 2011/0038476 A1 | 2/2011 | Anisimov et al. | |
| 2017/0255880 A1 | 9/2017 | Daher et al. | |
| 2018/0218734 A1* | 8/2018 | Somech | G10L 15/26 |
| 2018/0367670 A1 | 12/2018 | Kazerani et al. | |
| 2019/0158309 A1* | 5/2019 | Park | H04L 12/2812 |
| 2020/0064007 A1* | 2/2020 | Escapa | G05B 15/02 |
| 2021/0097488 A1 | 4/2021 | Hirasawa et al. | |

FOREIGN PATENT DOCUMENTS

| | | | |
|---|---|---|---|
| JP | 2018-112945 A | 7/2018 | |
| JP | 2019-049871 A | 3/2019 | |
| JP | 2019-101566 A | 6/2019 | |
| JP | 2019-144917 A | 8/2019 | |

OTHER PUBLICATIONS

International Search Report for PCT Application No. PCT/JP2020/011775, mailed on Aug. 4, 2020.

US Office Action for U.S. Appl. No. 17/908,604, mailed on Aug. 29, 2024.

US Office Action for U.S. Appl. No. 18/387,207, mailed on Oct. 24, 2024.

U.S. Notice of Allowance for U.S. Appl. No. 17/908,604, mailed on Jan. 13, 2025.

Karunasena, R., Sandarenu, P., Pinto, M., Athukorala, A., Rodrigo, R., and Jayasekara, P., "DEVI: Open-source Human-Robot Interface for Interactive Receptionist Systems", 2019 IEEE 4th International Conference on Advanced Robotics and Mechatronics (ICARM), 2019, pp. 378-pp. 383.

* cited by examiner

Mr./Ms. YY (VISIT DESTINATION) PERMITTED THE VISIT APPOINTMENT BY Mr./Ms. XX (YOU).

Fig. 11

Mr./Ms. YY (VISIT DESTINATION) REPLIED
"I AM AFRAID THAT I AM INCAPABLE OF RECEPTION NOW".

Fig. 12

VISIT ASSISTANCE DEVICE, VISIT ASSISTANCE SYSTEM, VISIT ASSISTANCE METHOD, AND NON-TRANSITORY COMPUTER-READABLE MEDIUM HAVING PROGRAM STORED THEREIN

This application is a Continuation of U.S. application Ser. No. 17/908,604 filed on Sep. 1, 2022, which is a National Stage Entry of PCT/JP2020/011775 filed on Mar. 17, 2020, the contents of all of which are incorporated herein by reference, in their entirety.

TECHNICAL FIELD

The present disclosure relates to a visit assistance device, a visit assistance system, a visit assistance method, and a non-transitory computer-readable medium having a program stored therein.

BACKGROUND ART

A technique has been known which manages whether or not a person such as a worker is present in an office or the like. For example, Patent Literature 1 discloses a system in which a presence situation of a user can be checked without movement to his/her seat position. This system detects the face of a user based on an image input from a camera of a user terminal and determines whether or not the user is present. Then, presence information as the determination result is stored in a server.

CITATION LIST

Patent Literature

Patent Literature 1

Japanese Unexamined Patent Application Publication No. 2019-101566

SUMMARY OF INVENTION

Technical Problem

In a technique of Patent Literature 1, a presence situation of a user at a visit destination can in advance be checked. However, there is a problem that even when the user at the visit destination is present, the user may have difficulty in reception for the visitor due to being busy with certain work or the like. In this case, even when the visitor can see the user at the visit destination, the visitor is not sufficiently received by the user, and the user at the visit destination is disturbed by a visit. That is, a comfortable visit cannot be realized.

The present disclosure has been made for solving such problems, and an object thereof is to provide a visit assistance device, a visit assistance system, a visit assistance method, and a program that can assist realization of a comfortable visit.

Solution to Problem

A visit assistance device according to a first aspect of the present disclosure includes:
a registration unit configured to register a status in a seated condition of a user who is seated in a predetermined space for each user; and
a display control unit configured to cause a display device installed in an entrance of the space to display the registered status of the user together with information identifying the user.

A visit assistance system according to a second aspect of the present disclosure includes:
an information processing device configured to be installed in an entrance of a predetermined space; and
a visit assistance device configured to assist a visit to a user in the space,
in which the visit assistance device includes
a registration unit configured to register a status in a seated condition of the user who is seated in the space for each user and
a display control unit configured to cause the information processing device to display the registered status of the user together with information identifying the user.

A visit assistance method according to a third aspect of the present disclosure includes:
registering a status in a seated condition of a user who is seated in a predetermined space for each user; and
causing a display device installed in an entrance of the space to display the registered status of the user together with information identifying the user.

A program according to a fourth aspect of the present disclosure causes a computer to execute:
a registration step of registering a status in a seated condition of a user who is seated in a predetermined space for each user; and
a display control step of causing a display device installed in an entrance of the space to display the registered status of the user together with information identifying the user.

Advantageous Effects of Invention

The present disclosure can provide a visit assistance device, a visit assistance system, a visit assistance method and a program that can assist realization of a comfortable visit.

BRIEF DESCRIPTION OF THE DRAWINGS

FIG. 11 illustrates a display example in a case where a response to permit a visit is obtained;

FIG. 12 illustrates a display example in a case where a response to refuse a visit is obtained;

EXAMPLE EMBODIMENT

Figure 1:
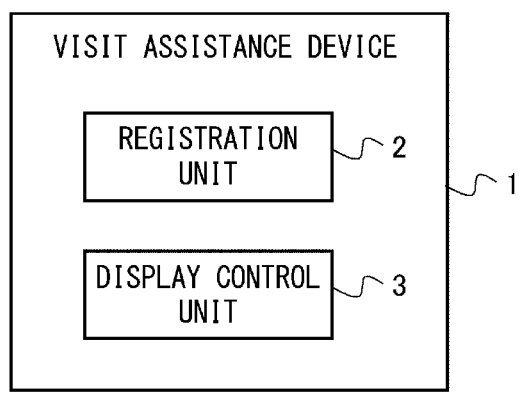
FIG. 1 is a block diagram illustrating one example of a configuration of a visit assistance device according to a first example embodiment.

For clarification of descriptions, omission and simplification are appropriately made in the following descriptions and drawings. In each of the drawings, the same reference characters are given to the same or corresponding elements, and for clarification of descriptions, repeated descriptions will be omitted as needed. Further, execution order of processes which is illustrated in the present disclosure by flowcharts, sequence charts, or the like is only one example, and execution order can appropriately be switched as long as technical contradiction does not occur. Further, characteristics of example embodiments can be combined together as long as technical contradiction does not occur.

First Example Embodiment

FIG. 1 is a block diagram illustrating one example of a configuration of a visit assistance device 1 according to a first example embodiment. The visit assistance device 1 is a device which assists a visit to a user in a predetermined space. Here, in the present disclosure, a space may be a space having a predetermined region and may be a whole floor in a building or a room, for example. In a space, seats to be used by users exist. The seats are provided with respective desks, for example, and the user uses the seat to perform work, for example. Note that the seat to be used may be decided for each user, or the seat to be used may not have to be decided for each user. That is, the user may select a seat which the user likes.

As illustrated in FIG. 1, the visit assistance device 1 has a registration unit 2 and a display control unit 3.

The registration unit 2 registers a status in a seated condition of the user who is seated in a predetermined space for each user. For example, based on an input from the user, the registration unit 2 stores identification information of the user and the status of the user in a storage device while associating those with each other. The input from the user may be an input to the visit assistance device 1 or may be an input to another device. In a case where an input of a status is made to the other device, the visit assistance device 1 acquires the input status from the other device. Note that the above-described storage device is included in the visit assistance device 1, for example, but may be included in another device. Here, as described above, a status denotes the status in the seated condition. Specifically, example may include statuses, which serve as criteria about whether or not the seated user is presently capable of reception for a visit, such as "capable of reception", "incapable of reception", "during certain work", "during reception", and "during break".

The display control unit 3 causes a display device installed in an entrance of the space to display the above-described registered status of the user together with information identifying the user. As the information identifying the user, arbitrary information for identifying the user can be used. For example, the information may be a name of the user, a user ID, an image of the face of the user.

Figure 2:
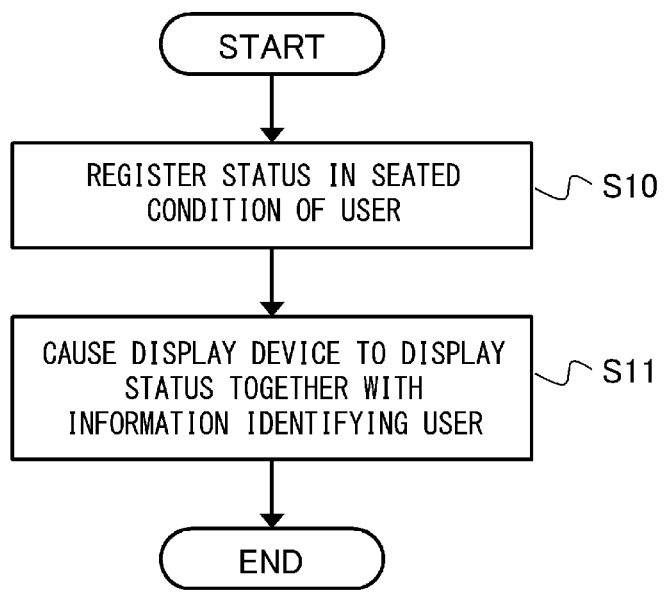
FIG. 2 is a flowchart illustrating a flow of a visit assistance method according to the first example embodiment.

FIG. 2 is a flowchart illustrating a flow of a visit assistance method according to the first example embodiment.

In step S10, the registration unit 2 registers the status in the seated condition of the user who is seated in a predetermined space for each user. Next, in step S11, the display control unit 3 causes the display device installed in the entrance of the space to display the registered status of the user together with the information identifying the user.

As described above, in the visit assistance device 1, the status in the seated condition of the user is registered, and the registered status is displayed by the display device installed in the entrance. Thus, a visitor checks the displayed status and can thereby obtain criteria about whether or not a visit destination user is presently capable of reception for a visit. Consequently, at a timing when the visit destination user has difficulty in reception, the visitor can be inhibited from meeting with the visit destination user. In other words, at a preferable timing for the visit destination user, the visitor is capable of meeting with the visit destination user. Consequently, in the present example embodiment, realization of a comfortable visit can be assisted. Note that in the present disclosure, a visitor denotes a person who comes to see a specific user. A visit destination user denotes a user from a visited party. That is, a visit destination user denotes a user whom the visitor wants to see. The number of visit destination users may be plural persons.

Note that the visit assistance device 1 includes a processor, a memory, and a storage device as configurations which are not illustrated. Further, the storage device stores a computer program in which a process of the visit assistance method is implemented. Furthermore, the processor reads the computer program from the storage device into the memory and executes the computer program. Accordingly, the processor realizes functions of the registration unit 2 and the display control unit 3.

Alternatively, each of the registration unit 2 and the display control unit 3 may be realized with dedicated hardware. Further, a portion or a whole of each configuration element of each device may also be realized with a general-purpose or dedicated circuit (circuitry), a processor, or the like or a combination of those. Those may be configured with a single chip or may be configured with plural chips which are connected together via a bus. A portion or a whole of each configuration element of each device may also be realized with a combination of the above-described circuit or the like and a program. Further, as the processor, a CPU (central processing unit), a GPU (graphics processing unit), an FPGA (field-programmable gate array), or the like may be used.

Further, in a case where a portion or a whole of each configuration element of the visit assistance device 1 is realized with plural information processing devices, circuits, or the like, the plural information processing devices, circuits, or the like may concentratedly be arranged or may dispersedly be arranged. For example, the information processing devices, circuits, or the like may be realized in a form in which those are connected with each other via a communication network, such as a client server system or a cloud computing system. Further, functions of the visit assistance device 1 may be provided in a SaaS (software as a service) form.

In the following, a description will be made about an example embodiment in which the first example embodiment is made more specific.

Second Example Embodiment

Figure 3:
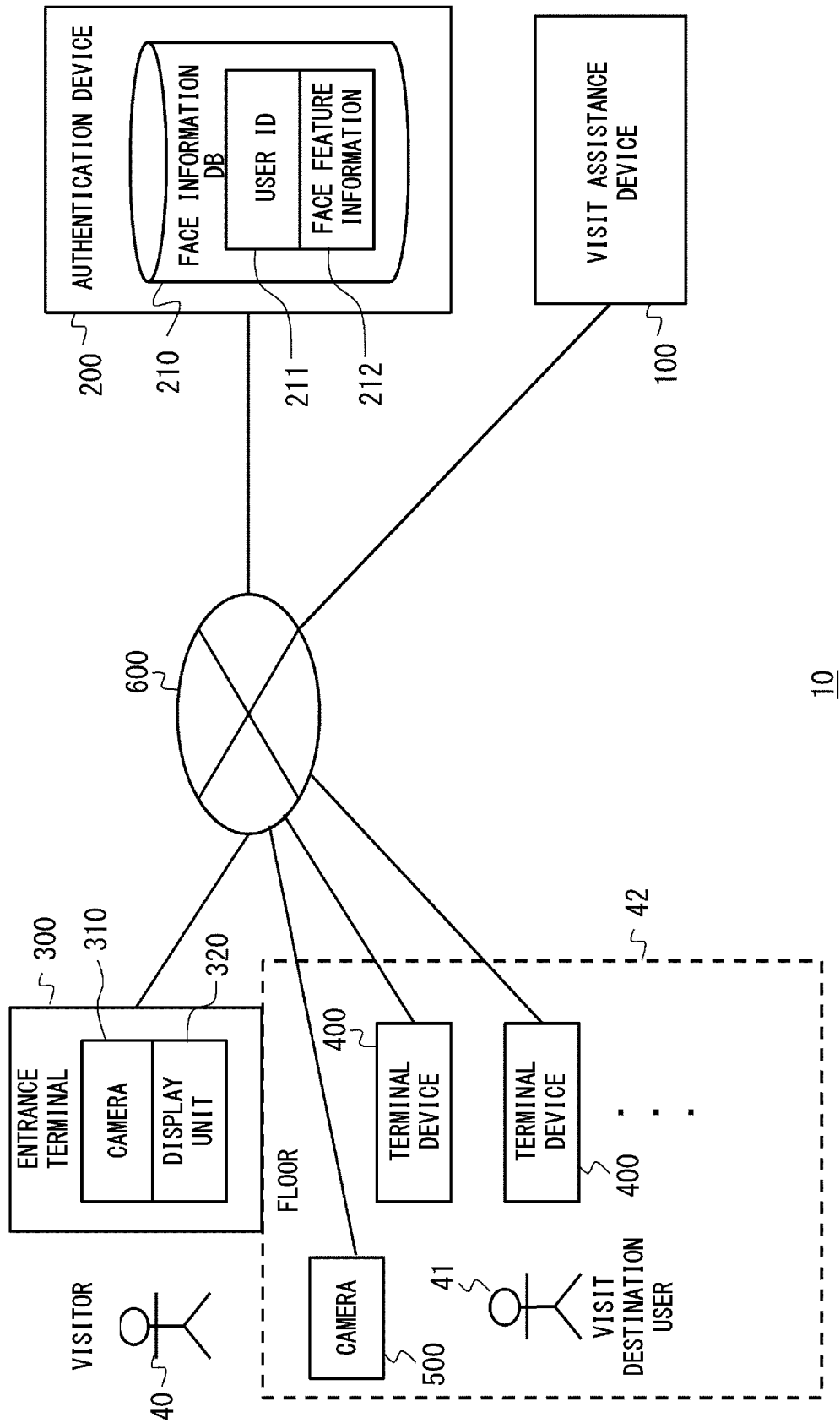
FIG. 3 is a block diagram illustrating a configuration of a visit assistance system according to a second example embodiment.

FIG. 3 is a block diagram illustrating a configuration of a visit assistance system 10 according to a second example embodiment. The visit assistance system 10 includes a visit assistance device 100, an authentication device 200, an entrance terminal 300, a terminal device 400, and a camera 500. The visit assistance device 100, the authentication device 200, the entrance terminal 300, the terminal device 400, and the camera 500 are connected with each other to be capable of communication via a wired or wireless network 600.

The visit assistance device 100 corresponds to the visit assistance device 1 illustrated in FIG. 1 and is a device which assists a visit to a user in a predetermined space. That is, the visit assistance device 1 is a device which assists a visitor 40 in visiting a visit destination user 41 in a space. Note that in the present example embodiment, as one example, a predetermined space is a floor 42 in a building. The visit assistance device 100 performs generation of a floor map in which the status of the user is noted, a notification about a visit, and so forth. The visit assistance device 100 is a server device which is realized with a computer, for example. Details of the visit assistance device 100 will be described later.

The authentication device 200 is a device which includes a face information DB (database) 210 and performs a face authentication process. The face information DB 210 stores a user ID 211 and face feature information 212 of the user while associating those with each other. In the present example embodiment, it is assumed that the face feature information 212 of plural users is in advance registered in the authentication device 200. Here, those users include the visit destination user 41 and the visitor 40. The face information DB 210 is realized with a storage device such as a memory included in the authentication device 200, for example. The face information DB 210 will also be referred to as storage unit. In response to a face authentication request received from the outside, the authentication device 200 collates a face image or face feature information included in the request with the face feature information 212 of each user and sends a collation result back to a request source.

The entrance terminal 300 is an information processing device which is installed in an entrance of a predetermined space. In the present example embodiment, the entrance terminal 300 is installed in an entrance of the floor 42. The entrance terminal 300 includes a camera 310 and a display unit 320. The camera 310 is one example of a photographing device installed in the entrance and is installed to photograph the face of the visitor 40 who comes to the entrance of the floor 42. The display unit 320 is one example of a display device installed in an entrance of a space and is specifically a flat panel display such as a liquid crystal display, a plasma display, or an organic light-emitting diode display, for example. In the present example embodiment, the display unit 320 is configured as a touch panel and also functions as an input device which accepts an input from a user.

Note that in the present example embodiment, as one example, the entrance terminal 300 includes the camera 310 and the display unit 320, but either one or both of the camera 310 and the display unit 320 may exist as devices separate from the entrance terminal 300.

The terminal device 400 is an information processing device such as a PC (personal computer) which is installed in each seat provided in a predetermined space. In the present example embodiment, the terminal device 400 is installed in each of seats provided in the floor 42. Note that in FIG. 3, as one example, two terminal devices 400 are illustrated, but the number of terminal devices 400 may be three or more or one. In the present example embodiment, the seat to be used is not decided for each user, but the user can use an arbitrary terminal device 400. The terminal device 400 receives a notification from the visit assistance device 100 and outputs a notification content via the network 600. An output of the notification content may be an output by display or may be an output by sound. In a case of the output by display, the terminal device 400 includes a display and performs display on the display. Further, in a case of the output by sound, the terminal device 400 includes a speaker and outputs a sound from the speaker.

The camera 500 is a camera which photographs an inside of a predetermined space. More specifically, the camera 500 is a camera which is installed to photograph the face of the user on the seat in the predetermined space. An image photographed by the camera 500 is transmitted to the visit assistance device 100. Note that plural cameras 500 may be set.

Figure 4:
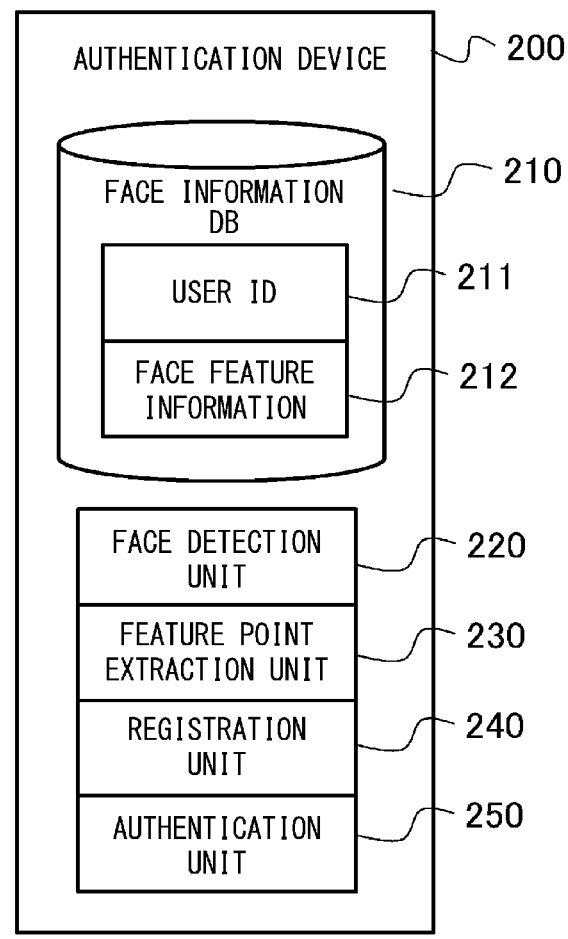
FIG. 4 is a block diagram illustrating a configuration of an authentication device according to the second example embodiment.

Next, functions of the authentication device 200 will be described in detail. FIG. 4 is a block diagram illustrating a configuration of the authentication device 200. The authentication device 200 includes the above-described face information DB 210, a face detection unit 220, a feature point extraction unit 230, a registration unit 240, and an authentication unit 250.

The face detection unit 220 detects a face region which is included in an image for registration of face information or an image for face authentication. The face detection unit 220 detects a region of a face from an image by a known image recognition process.

The feature point extraction unit 230 extracts a feature point from a face region detected by the face detection unit 220. Note that the feature point extraction unit 230 may extract a feature amount about the feature point. Further, instead of those, other feature information may be extracted. The feature point extraction unit 230 extracts feature information of a face (also referred to as face information) for the face authentication. Note that because the face authentication is realizable by a known technique, a detailed description about the feature information for the face authentication will not be made.

The registration unit 240 registers the feature information extracted by the feature point extraction unit 230 together with a user ID in the face information DB 210. The registration unit 240 newly issues a user ID in registration of the feature information. The registration unit 240 registers the issued user ID and the feature information extracted from the image for registration of the face information in the face information DB 210 while associating those with each other.

The authentication unit 250 performs the face authentication by collating the feature information extracted from the image for the face authentication by the feature point extraction unit 230 with the feature information registered in the face information DB 210. The authentication unit 250 sends back whether or not the pieces of feature information agree with each other to a device which has transmitted an authentication request. Whether or not the pieces of feature information agree with each other corresponds to success or failure in authentication.

Figure 5:
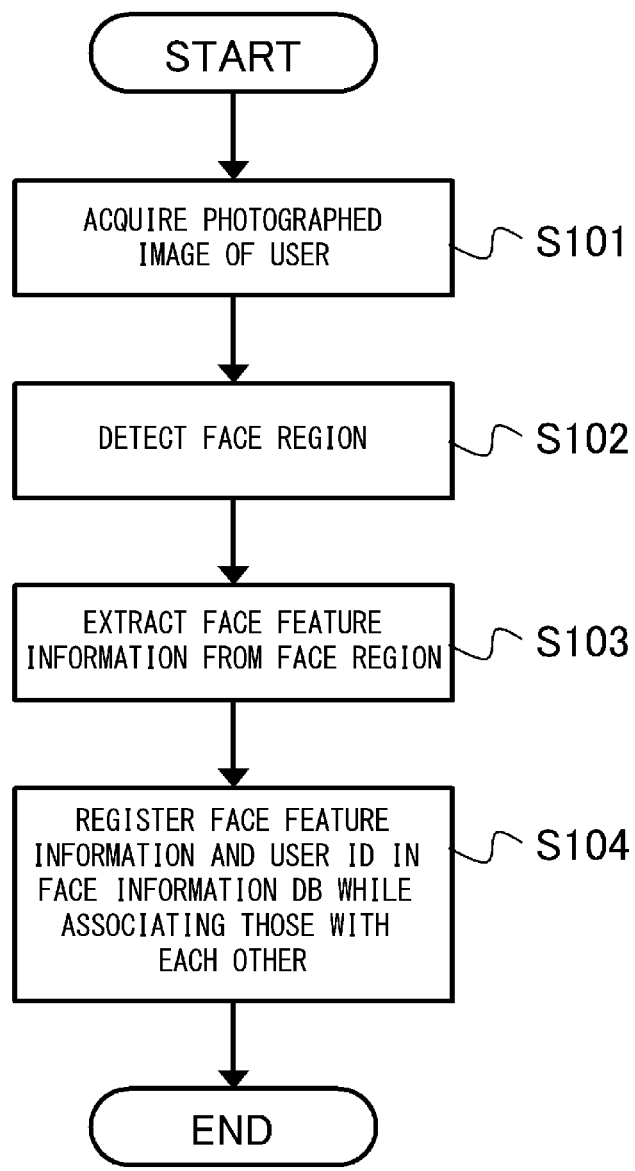
FIG. 5 is a flowchart illustrating a flow of a face information registration process by the authentication device according to the second example embodiment.

FIG. 5 is a flowchart illustrating a flow of a face information registration process by the authentication device 200. In the following, the flow of the face information registration process will be described with reference to FIG. 5.

First, in step S101, the authentication device 200 acquires an image in which the face of the user is photographed. For example, the authentication device 200 acquires an image included in a face information registration request which is received from a face information registration device (not illustrated) via the network 600. Note that it is sufficient that the face information registration device is an information processing device such as a personal computer.

Next, in step S102, the face detection unit 220 detects the face region which is included in the image acquired in step S101.

Next, in step S103, the feature point extraction unit 230 extracts the feature information of the face from the face region detected in step S102.

Finally, in step S104, the registration unit 240 issues the user ID and registers the user ID and the feature information of the face in the face information DB 210 while associating those with each other. Note that the registration unit 240 may acquire personal information such as the name of the user as a registration target from the face information registration device or the like and may register this personal information in the face information DB 210 while associating that with the user ID. Further, the registration unit 240 may send a registration result back to a device as a transmission source of the face information registration request. Note that the authentication device 200 may receive the face information registration request including the feature information of the face, and in this case, processes in step S101 to step S103 can be skipped.

Figure 6:
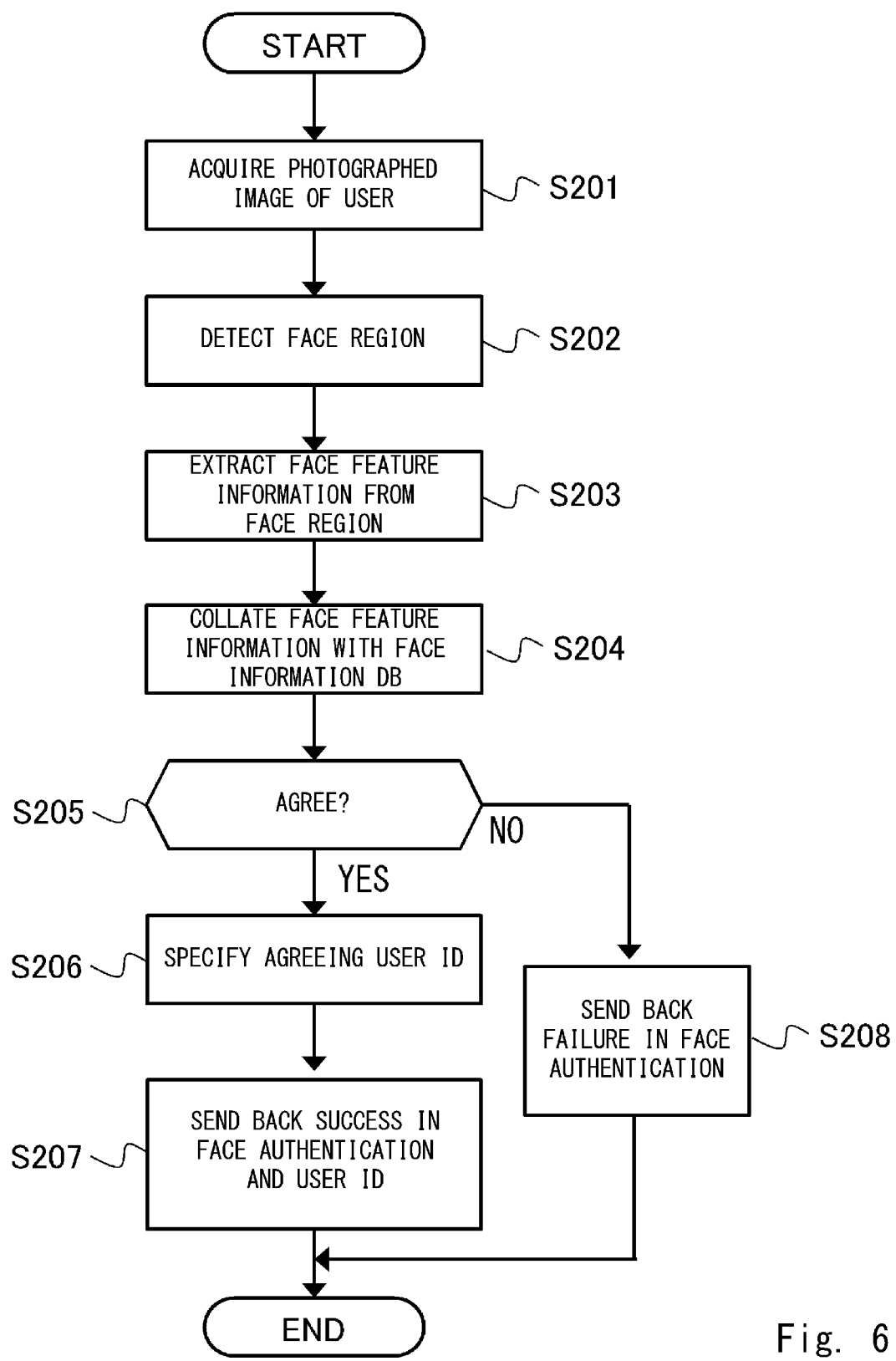
FIG. 6 is a flowchart illustrating a flow of a face authentication process by the authentication device according to the second example embodiment.

FIG. 6 is a flowchart illustrating a flow of the face authentication process by the authentication device 200. In the following, the flow of the face authentication process will be described with reference to FIG. 6.

First, in step S201, the authentication device 200 acquires an image in which the face of the user is photographed. For example, the authentication device 200 receives the face authentication request which includes the image photographed by the camera 310 of the entrance terminal 300 from the visit assistance device 100 via the network 600 and acquires the image included in this face authentication request.

Next, in step S202, the face detection unit 220 detects the face region which is included in the image acquired in step S201.

Next, in step S203, the feature point extraction unit 230 extracts the feature information of the face from the face region detected in step S202. Note that the authentication device 200 may receive the face authentication request including the feature information of the face, and in this case, processes in step S201 to step S203 can be skipped.

Next, in step S204, the authentication unit 250 collates the feature information of an authentication target with the face information DB 210. In a case where the feature information of the authentication target agrees with the feature information of any registered user (YES in step S205), the process moves to step S206. In a case where the feature information does not agree with the feature information of any user (NO in step S205), the process moves to step S208.

In step S206, the authentication unit 250 specifies the user ID of the user whose feature information agrees with the feature information of the authentication target.

Then, in step S207, the authentication unit 250 transmits an authentication result indicating that the face authentication has succeeded to a device (for example, the visit assistance device 100) as a transmission source of the face authentication request. Specifically, the authentication unit 250 sends back the fact that the face authentication has succeeded and the specified user ID to a request source. Note that the authentication unit 250 may send back personal information such as the name of the authenticated user to the request source.

On the other hand, in step S208, the authentication unit 250 transmits an authentication result indicating that the face authentication has failed to a device (for example, the visit assistance device 100) as a transmission source of the face authentication request.

Figure 7:
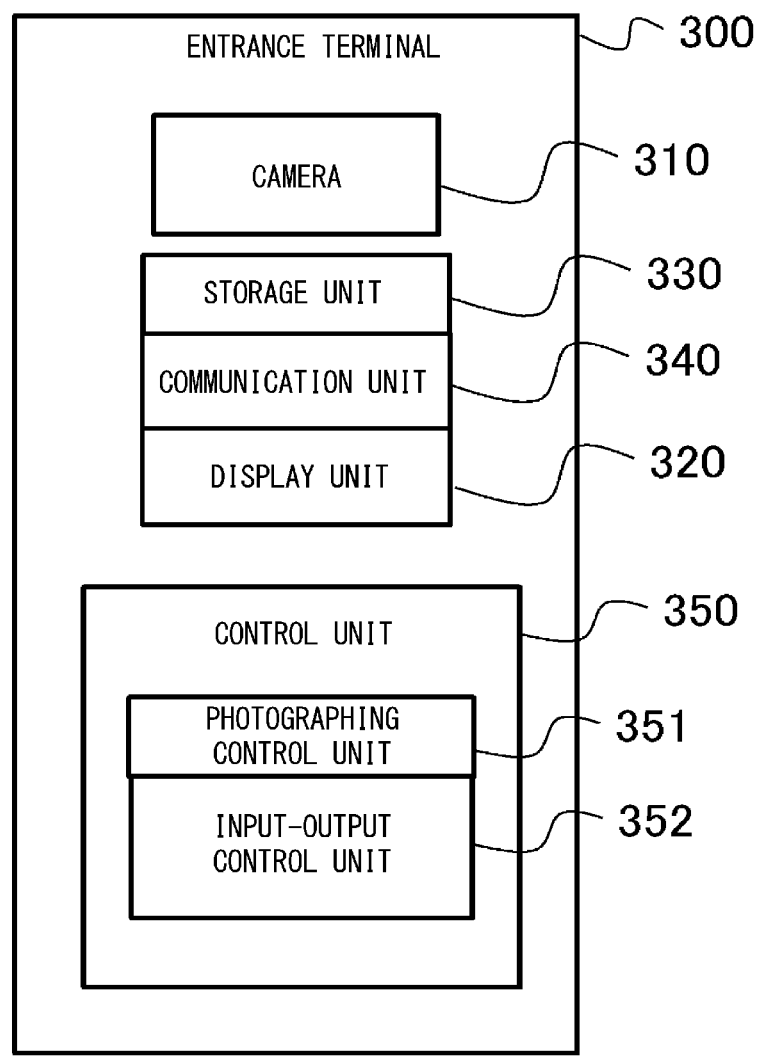
FIG. 7 is a block diagram illustrating a configuration of an entrance terminal according to the second example embodiment.

Next, the entrance terminal 300 will be described in detail. FIG. 7 is a block diagram illustrating a configuration of the entrance terminal 300. The entrance terminal 300 includes a storage unit 330, a communication unit 340, and a control unit 350 in addition to the above-described camera 310 and display unit 320. Note that as described above, in the present example embodiment, the display unit 320 is configured as a touch panel and accepts an input from the user, but the display unit 320 may not necessarily have to include a function of accepting an input from the user. Further, in this case, the entrance terminal 300 may be provided with an input device which accepts an input from the user, separately from the display unit 320.

The storage unit 330 is a storage device which stores a program for realizing each function of the entrance terminal 300 and data to be used for processes by the entrance terminal 300. This storage device may be a non-volatile storage device such as a hard disk or a flash memory and may include a memory such as a RAM (random access memory), for example. The communication unit 340 is a communication interface for performing communication via the network 600. The control unit 350 is a processor which controls each configuration of the entrance terminal 300, in other words, a control device. The control unit 350 reads a program into the memory and executes a process. Accordingly, the control unit 350 realizes functions of a photographing control unit 351 and an input-output control unit 352.

The photographing control unit 351 controls the camera 310 such that the camera 310 photographs a visitor who arrives at the entrance. For example, the photographing control unit 351 photographs an image which includes the face of the visitor when a photographing instruction is input from the visitor arriving at the entrance. Note that as this photographing instruction, an instruction for appointing a visit may be used. Further, the photographing control unit 351 transmits a photographed image to the visit assistance device 100 via the communication unit 340 and the network 600.

The input-output control unit 352 controls a process for accepting an input from the user and a process for displaying information on the display unit 320. For example, the input-output control unit 352 performs an acceptance process of an input which designates the visit destination user (for example, the ID, name, or the like of the visit destination user) from the visitor, an acceptance process of an input of an instruction for appointing a visit, and so forth. The input-output control unit 352 transmits an accepted input to the visit assistance device 100 via the communication unit 340 and the network 600. Further, the input-output control unit 352 displays, on the display unit 320, information which is received from the visit assistance device 100 via the network 600 and the communication unit 340. For example, the input-output control unit 352 displays, on the display unit 320, the floor map in which the status of the user is noted, a response result to a visit appointment, and so forth, which are received from the visit assistance device 100.

Note that the entrance terminal 300 may be connected with a gate which controls entering and exiting of persons with respect to the space (floor) to be capable of communicating with the gate. In such a case, in a case where a response permitting an appointment (a response permitting a visit) is obtained, as a response to a visit appointment, from the visit assistance device 100, the entrance terminal 300 may release a lock of the gate.

Figure 8:
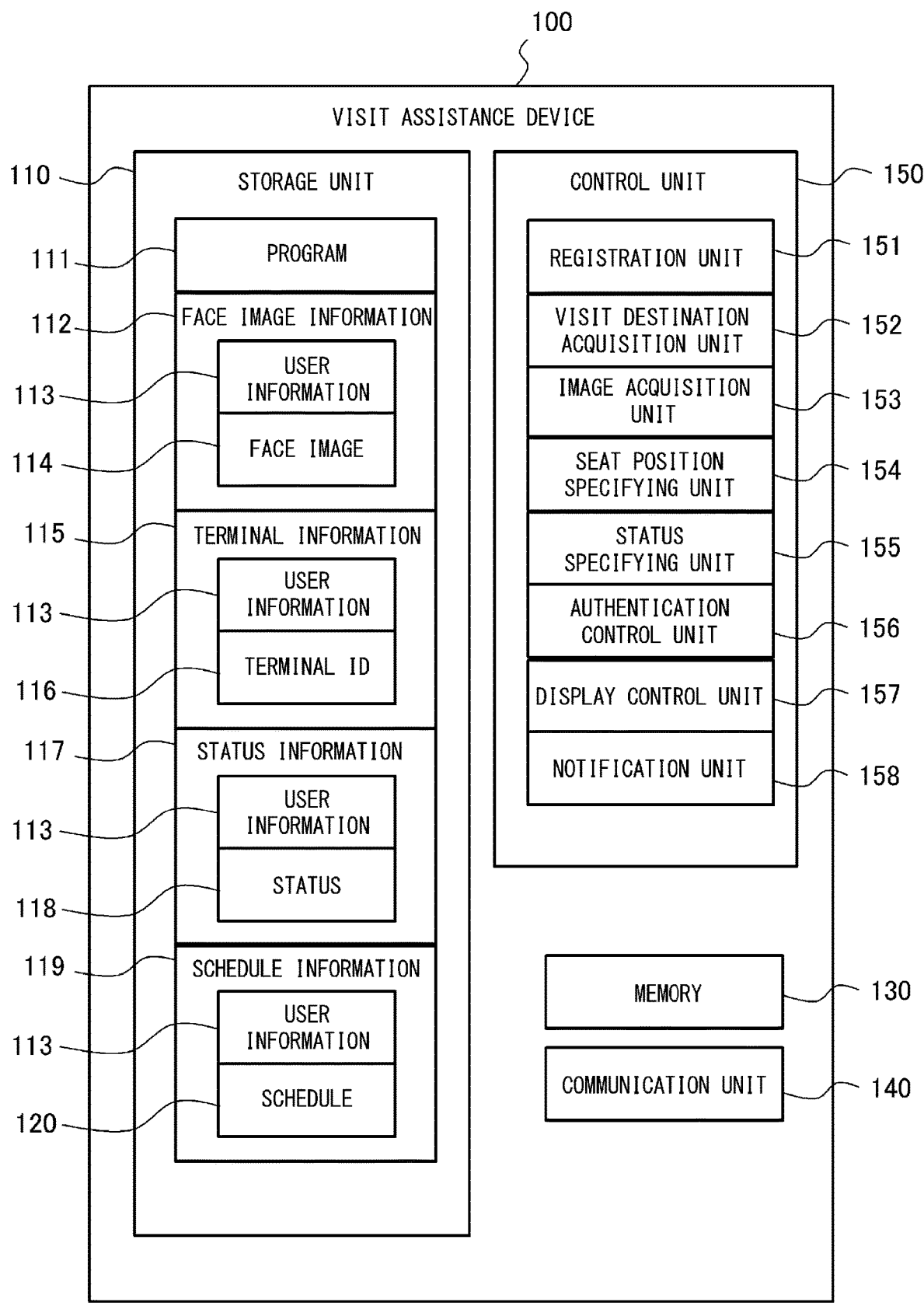
FIG. 8 is a block diagram illustrating a configuration of a visit assistance device according to the second example embodiment.

Next, the visit assistance device 100 will be described in detail. FIG. 8 is a block diagram illustrating a configuration of the visit assistance device 100. The visit assistance device 100 includes a storage unit 110, a memory 130, a communication unit 140, and a control unit 150.

The storage unit 110 is a non-volatile storage device such as a hard disk or a flash memory. The storage unit 110 stores a program 111 for performing various processes of the visit assistance device 100. Further, the storage unit 110 stores face image information 112, terminal information 115, status information 117, and schedule information 119.

The face image information 112 is a face image of each user. That is, the face image information 112 is information in which user information 113 including information identifying a user is associated with a face image 114 of the user. Note that this face image information 112 is used for displaying face images of the users who are present on the floor on the floor map, for example. Thus, the face images of users who can exist on the floor are in advance stored as the face image information 112 in the storage unit 110.

The terminal information 115 is information which indicates the terminal device 400 used by each user. That is, the terminal information 115 is information in which the user information 113 including information identifying a user is associated with a terminal ID 116 identifying the terminal device 400 which is presently used by the user. Note that this terminal information 115 is used for notifying the user, who is present on the floor, about a visit, for example. Thus, information identifying the terminal device 400 used by the user who exists on the floor is stored as the terminal information in the storage unit 110. For example, when the user logs in the terminal device 400, the ID of the terminal device 400 and the user information 113 of the user who has logged in the terminal device 400 are notified to the visit assistance device 100, and the terminal information 115 is stored based on this notification.

The status information 117 is information which indicates a present status of each user. In particular, this status serves as information which indicates the status in the seated condition in a case where the user is seated. Specifically, the status information 117 is information in which the user information 113 including information identifying a user is associated with a status 118 of the user. Note that this status information 117 is used for displaying the status of the user on the entrance terminal 300, for example. The status information 117 is stored in the storage unit 110 by a registration process by a registration unit 151 which will be described later. As described above, the storage unit 110 stores the status of each user.

The schedule information 119 is information which indicates a schedule of each user. Specifically, the schedule information 119 is information in which the user information 113 including information identifying a user is associated with a schedule 120 of the user. For example, the schedule 120 may indicate plans accompanying absence such as "conference", "early leaving", and "going out". Note that this schedule information 119 is used for displaying the schedule of the user on the entrance terminal 300, for example. The schedule information 119 is stored in the storage unit 110 by the registration process by the registration unit 151 which will be described later. As described above, the storage unit 110 stores the schedule of each user.

The memory 130 is a volatile storage device such as a RAM and is a storage region for temporarily retaining information when the control unit 150 acts. The communication unit 140 is a communication interface for performing communication via the network 600. For example, the communication unit 140 outputs data acquired via the network 600 to the control unit 150. Further, the communication unit 140 outputs data accepted from the control unit 150 to the network 600.

The control unit 150 is a processor such as a CPU which controls each configuration of the visit assistance device 100, in other words, a control device. The control unit 150 reads the program 111 from the storage unit 110 into the memory 130 and executes the program 111. Accordingly, the control unit 150 realizes functions of the registration unit 151, a visit destination acquisition unit 152, an image acquisition unit 153, a seat position specifying unit 154, a status specifying unit 155, an authentication control unit 156, a display control unit 157, and a notification unit 158.

The registration unit 151 corresponds to the registration unit 2 in FIG. 1. In the present example embodiment, the registration unit 151 registers a present status of the user for each user. In particular, the registration unit 151 registers the status in the seated condition, about the seated user in a floor, for each user. For example, as the statuses of the seated user, statuses are registered which serve as criteria about whether or not the seated user is presently capable of reception for a visit, such as "capable of reception", "incapable of reception", "during certain work", "during reception", and "during break". Note that the registration unit 151 may further register a status of an absent user for each user. For example, statuses may be registered which indicate non-presence such as "absent", "not present", and "on vacation". Based on an input from the user to the terminal device 400, for example, the registration unit 151 registers the user information 113 including the identification information of the user and the status 118 of the user, as status information 117, in the storage unit 110 while associating those with each other. Note that the user may input his/her own status not to the terminal device 400 but to another device. In this case, the registration unit 151 acquires the identification information of the user and the status of the user from the other device and registers those as the status information 117 in the storage unit 110. The other device may be the visit assistance device 100.

Further, the registration unit 151 registers the schedule of the user for each user. Based on an input from the user to the terminal device 400, for example, the registration unit 151 registers the user information 113 including the identification information of the user and the schedule 120 of the user, as the schedule information 119, in the storage unit 110 while associating those with each other. Note that the user may input his/her own schedule not to the terminal device 400 but to another device. In this case, the registration unit 151 acquires the identification information of the user and the schedule of the user from the other device and registers those as the schedule information 119 in the storage unit 110. The other device may be the visit assistance device 100.

The visit destination acquisition unit 152 acquires a visit destination user of a visitor who arrives at an entrance of a predetermined space. In the present example embodiment, the visit destination acquisition unit 152 acquires information specifying a party whom the visitor arriving at the entrance of the floor desires to visit. The visit destination acquisition unit 152 can acquire the visit destination user by an arbitrary method. For example, the visit destination acquisition unit 152 acquires the visit destination user by receiving an input which is input to the entrance terminal 300 by the visitor and designates the visit destination user (for example, the ID, name, or the like of the visit destination user). Note that the visit destination acquisition unit 152 is not limited to such an acquisition method but may acquire information which is in advance registered in the system and designates the visit destination user, for example, or may acquire the visit destination user by another method.

The image acquisition unit 153 acquires an image which includes a face. For example, the image acquisition unit 153 acquires a photographed image of the visitor by a photographing device which is installed in an entrance. In the present example embodiment, this photographing device is specifically the camera 310 of the entrance terminal 300 and photographs an image including the face of the visitor who arrives at an entrance of a predetermined space (floor). Further, the image acquisition unit 153 acquires a photographed image of the user by a photographing device which is installed in the predetermined space (floor). In the present example embodiment, this photographing device is specifically the camera 500 and photographs an image including the face of the user who is present at a seat in the predetermined space (floor). The image acquisition unit 153 acquires the photographed image of the visitor by the camera 310 of the entrance terminal 300 via the network 600. Similarly, the image acquisition unit 153 acquires a photographed image by the camera 500 via the network 600. Note that for convenience of description, the block diagram illustrated in FIG. 8 illustrates one image acquisition unit 153, but the visit assistance device 100 may include, as configurations, two image acquisition units which are an image acquisition unit acquiring an image by the camera 310 and an image acquisition unit acquiring an image by the camera 500.

The seat position specifying unit 154 specifies a seat position in which the user is seated in a predetermined space (floor). In the present example embodiment, the seat position in which the user is seated is specified based on an image photographed by the camera 500. Note that in a case where a seated position of the user is fixed, in other words, in a case where the user is not allowed to freely select a seat, the seat position specifying unit 154 may specify the seat position of the user by referring to management information indicating the seat position of each user which is in advance registered. In this case, the camera 500 may not have to be installed. Details of specification of the seat position based on an image by the camera 500 will be described later.

The status specifying unit 155 specifies the status which is registered while being associated with the visit destination user. Specifically, the status specifying unit 155 refers to the status 118 which is registered while being associated with the user information 113 of the visit destination user which is acquired by visit destination acquisition unit 152 and thereby specifies the status of the visit destination user. In addition, the status specifying unit 155 may further specify the schedule which is registered while being associated with the visit destination user. Specifically, the status specifying unit 155 refers to the schedule 120 which is registered while being associated with the user information 113 of the visit destination user which is acquired by the visit destination acquisition unit 152 and thereby specifies the schedule of the visit destination user. Note that the status specifying unit 155 may specify the status or the schedule of another user than the visit destination user.

The authentication control unit 156 performs control such that face authentication of the visitor is performed based on the photographed image acquired by the image acquisition unit 153. In the present example embodiment, the authentication control unit 156 performs control so as to perform the face authentication process using the authentication device 200. The authentication control unit 156 performs control so as to perform the face authentication about an image which is transmitted from the entrance terminal 300 and includes the face of the visitor. For example, the authentication control unit 156 transmits the face authentication request, which includes an image received from the entrance terminal 300, to the authentication device 200. Further, the authentication control unit 156 receives an authentication result from the authentication device 200. Accordingly, the face authentication of the visitor is performed.

The display control unit 157 corresponds to the display control unit 3 in FIG. 1. That is, the display control unit 157 causes the display unit 320 of the entrance terminal 300 to display the registered status of the user together with information identifying the user.

Further, the display control unit 157 performs control such that the display unit 320 of the entrance terminal 300 displays a map which indicates the seat position specified by the seat position specifying unit 154 together with information identifying the user who uses the seat. In the present example embodiment, specifically, the display control unit 157 generates a floor map that indicates the seat position of the user together with the face image 114 of the user which is stored in the storage unit 110 and causes the display unit 320 of the entrance terminal 300 to display the generated floor map. Note that as the information identifying the user who uses the seat, the name, ID, or the like of the user may be used instead of the face image 114. As described above, in the present example embodiment, because the map is displayed which indicates the seat position of the user together with the information identifying the user, the visitor can easily know the seat position of the user. In the present example embodiment, as a specific example illustrated in FIG. 9, the display control unit 157 performs control so as to display the floor map in which the status of the user is noted but may perform control so as to display the status separately from the map. Note that the floor map can be used not only for indicating the seat position of the user but also for designating the visit destination user, for displaying a route from the entrance to the visit destination user, or the like.

Further, in the present example embodiment, the display control unit 157 performs control such that as for display of the seat position and the status, only the user who satisfies a predetermined condition among seated users is displayed. More specifically, the display control unit 157 performs control such that only the user who corresponds to the visit destination user among the seated users is displayed. Thus, in display of the status, the display control unit 157 causes the display unit 320 to display the status of the visit destination user which is specified by the status specifying unit 155. Accordingly, the visitor can easily know the position and the status of a visited party. Note that as a predetermined condition, another condition may be used. For example, being related to the visitor may be a condition. A user related to the visitor may be a user who has performed communication with the visitor by electronic mail in the past or may be a user who has an experience of attending the same conference together with the visitor, for example. In order to make a determination about those, the visit assistance device 100 may store information indicating relations among users in the storage unit 110. As described above, the seat position and the status of only the user who satisfies a predetermined condition is displayed, and a display target can thereby be restricted. Thus, visibility of the map for the visitor can be improved. Note that the display control unit 157 may perform control so as to display seat positions and statuses of all of the users who are present. Alternatively, as for only either one of the seat position and the status, only the users who satisfy a predetermined condition may be set as display targets. Note that even in such a case, the floor map can be used not only for indicating the seat position of the user but also for designating the visit destination user, for display a route from the entrance to the visit destination user, or the like.

Further, the display control unit 157 may cause the display unit 320 of the entrance terminal 300 to display the schedule of the user which is in advance stored together with information identifying the user. Accordingly, the visitor can also know plans of the user. Thus, for example, in a case where the visit destination user is presently incapable of reception, the visitor can obtain beneficial information for considering an opportunity for making a visit again. Note that similarly to the seat position and the status, when the schedule is displayed, only the users who satisfy a predetermined condition may be set as display targets.

Moreover, in the present example embodiment, the display control unit 157 causes the display unit 320 of the entrance terminal 300 to display a user interface image for accepting a visit appointment.

Figure 9:
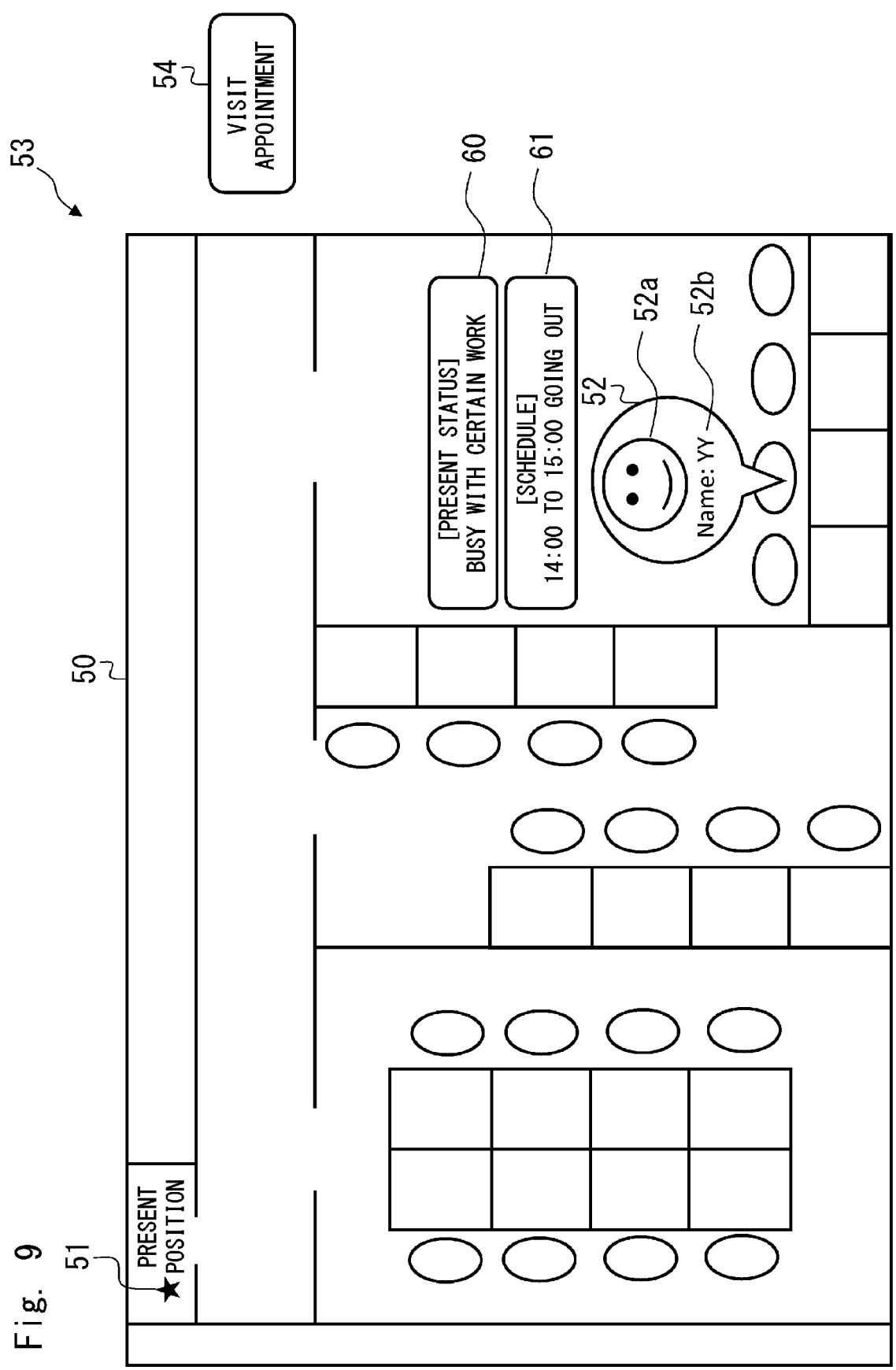
FIG. 9 is a diagram illustrating one example of a screen to be displayed on a display unit of the entrance terminal by control by a display control unit.

FIG. 9 is a diagram illustrating one example of a screen to be displayed on the display unit 320 of the entrance terminal 300 by control by the display control unit 157. The example illustrated in FIG. 9 displays a floor map 53, and a user interface image 54 for accepting a visit appointment. Here, the floor map 53 includes a map image 50 of the whole floor, a present position 51 of the visitor, an image 52 which indicates the seat position of the visit destination user, a status 60 of the visit destination user, and a schedule 61 of the visit destination user. Note that the status 60 of the visit destination user and the schedule 61 of the visit destination user may separately be displayed from the floor map 53. The present position 51 is the position corresponding to the entrance of the floor. Note that the display control unit 157 may further display a route from the present position 51 to the seat position of the visit destination user. The image 52 includes a face image 52a of the visit destination user and identification information 52b of the visit destination user. Those are specific examples of information identifying the user who uses the seat. The status 60 and the schedule 61 are display which represents contents of the status and schedule which are specified by the status specifying unit 155. When the visitor selects the user interface image 54 by a touch operation or the like, a visit appointment request is transmitted to the visit assistance device 100. That is, when an input for instructing an appointment for a visit to the visit destination user is accepted from the visitor, the entrance terminal 300 transmits the visit appointment request to the visit assistance device 100. Note that the image 52 may also be used as the user interface image for accepting a visit appointment. That is, when the visitor performs an operation of selecting the image 52 displayed in the seat position of the visit destination user, the visit appointment request may be transmitted to the visit assistance device 100.

Returning to FIG. 8, a description about the visit assistance device 100 will be continued.

The notification unit 158 performs a notification about a visit to the terminal device 400 associated with the visit destination user. Specifically, the notification unit 158 notifies that a visitor plans to make a visit. Note that the notification is not limited to this, but the notification unit 158 may perform a notification indicating that the visitor is likely to come to the seat of the visit destination user or may notify that the visitor is at the entrance, for example. The notification unit 158 refers to the terminal information 115 and specifies the terminal device 400 used by the visit destination user. In the present example embodiment, in a case where the face authentication of the visitor succeeds, the notification unit 158 performs such a notification. Thus, the visit destination user can be inhibited from being disturbed by a notification of a visit of a visitor who cannot be authenticated. Note that the notification unit 158 may perform a notification regardless of a result of the face authentication. Further, the notification unit 158 notifies the terminal device 400 of information of a visitor. That is, because the visitor is specified by authentication, the notification unit 158 notifies the terminal device 400 of information about the specified visitor. Note that specifically, for example, information identifying the visitor such as a name is notified. Accordingly, the visit destination user can specifically know who is making a visit. Note that the notification about the information about the visitor may be omitted.

As described above, the notification about a visit is performed for the terminal device 400 associated with the visit destination user, and the visit destination user can thereby know a visit of a visitor. Consequently, the visit destination user can be inhibited from becoming absent before the visitor arrives at the seat of the visit destination user. In other words, the visitor can more certainly see the visit destination user. Consequently, an efficient visit can be realized.

Further, in the present example embodiment, in a case where an appointment for a visit is requested, the notification unit 158 performs the above-described notification.

Specifically, when the visitor performs an operation of selecting the user interface image 54 for accepting a visit appointment, the notification unit 158 receives a visit appointment request from the entrance terminal 300. Then, when this appoint request is received, the notification unit 158 performs a notification. Accordingly, only in a case where an intention of a visit of the visitor is clear, a notification can be performed. That is, a notification can be inhibited from being unnecessarily performed.

Figure 10:
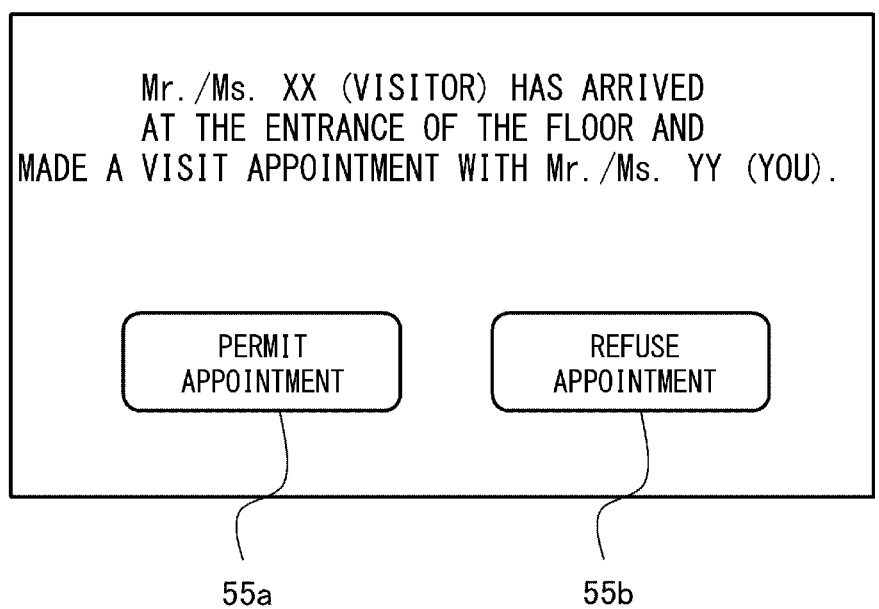
FIG. 10 is a diagram illustrating a display example of a notification in a terminal device which is used by a visit destination user.

A notification by the notification unit 158 is output and displayed on a display of the terminal device 400, for example. FIG. 10 is a diagram illustrating a display example of the notification in the terminal device 400 which is used by the visit destination user. In the example illustrated in FIG. 10, on the display of the terminal device 400, a visit by a visitor identified by identification information of XX (for example, a name or ID) to a user identified by identification information of YY is notified. Further, the example in FIG. 10 displays user interface images 55a and 55b for selecting whether or not a requested visit appointment is permitted (that is, whether or not the visit is permitted).

Note that the notification unit 158 may perform various notifications as notifications about a visit. For example, the notification may include personal information of a visitor. Specifically, the personal information may be a face image of the visitor. In this case, the face image may be an image photographed by the entrance terminal 300. Further, the personal information may be an attribute (such as the company to which the visitor belongs, the department to which the visitor belongs, or a rank, for example) of the visitor. Further, the notification may include history information about visits by the visitor. Specifically, this history information may be information indicating how many visits the visitor has made, that is, the total number of visits, may be the number of visits by the visitor which have been permitted in the past, or may be the number of visits by the visitor which have been refused in the past. Further, the notification may include information indicating whether or not the visitor corresponds to a predetermined person. Specifically, this information may be information indicating whether or not the visitor corresponds to an important person who is in advance set by the visit destination user or may be information indicating whether or not the visitor corresponds to a person requiring special attention who is in advance set by the visit destination user.

The visit destination user inputs an instruction of selecting either one of the user interface images 55a and 55b to the terminal device 400 and thereby designates whether or not a visit by the visitor is permitted. The terminal device 400 transmits this designation content as a response result to the notification to the visit assistance device 100. As illustrated in FIG. 11 or FIG. 12, this response result may be displayed on the display unit 320 of the entrance terminal 300. FIG. 11 illustrates a display example in a case where a response to permit a visit is obtained. Further, FIG. 12 illustrates a display example in a case where a response to refuse a visit is obtained. That is, in a case where a response result to the notification about a visit is received from the terminal device 400, the display control unit 157 of the visit assistance device 100 may cause the display unit 320 to display the response result. Accordingly, the visitor can be informed of the intention of the visit destination user about whether or not a visit is permitted. Note that the entrance terminal 300 may release the lock of the gate which controls entering and exiting of persons with respect to the space (floor) in a case where a response to permit a visit is obtained and may keep the lock of the gate locked in a case where a response to refuse a visit is obtained. Note that such control of the lock may be realized with another device (for example, the visit assistance device 100).

Figure 13:
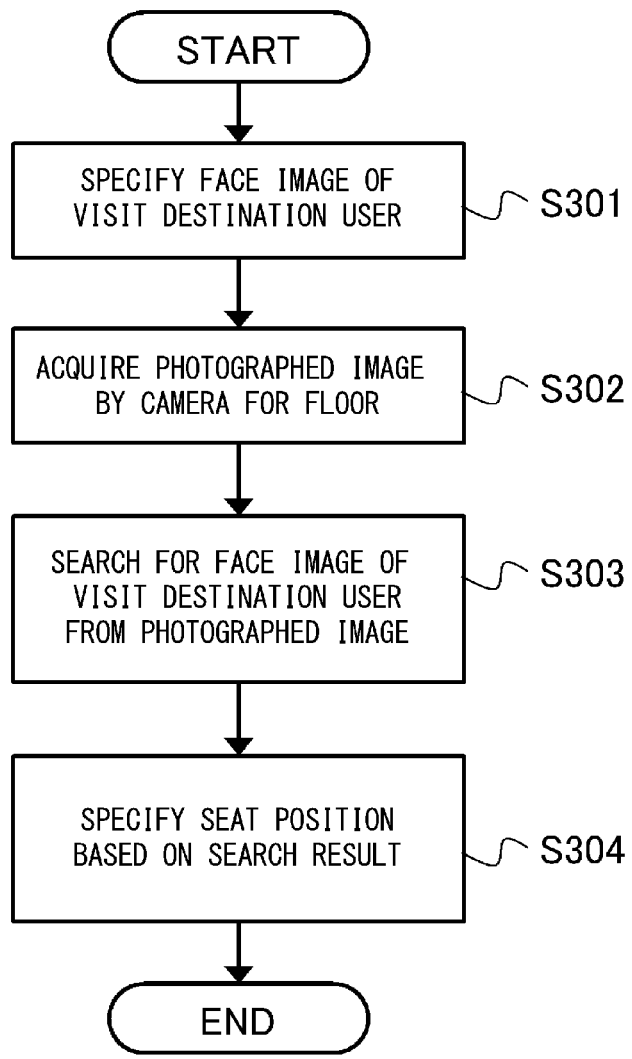
FIG. 13 is a flowchart illustrating a flow of a process of specifying a seat position by using a photographed image by a camera which photographs a floor.

Next, a description will be made about specification of a seat position by using a photographed image by the camera 500 which photographs the floor. FIG. 13 is a flowchart illustrating a flow of a process of specifying a seat position by using a photographed image by the camera 500 which photographs the floor. In the following, the flow of the process will be described along FIG. 13.

First, in step S301, the seat position specifying unit 154 specifies the face image of a user as a specification target of the seat position. Specifically, the seat position specifying unit 154 specifies the face image of the visit destination user. The seat position specifying unit 154 specifies the face image of the visit destination user, which is specified by information acquired by the visit destination acquisition unit 152, by referring to the face image information 112 stored in the storage unit 110.

Next, in step S302, the image acquisition unit 153 acquires a photographed image by the camera 500 which photographs the floor. In this photographed image, the face of each of users on seats in the floor appears.

Next, in step S303, the seat position specifying unit 154 searches for the face image of the visit destination user who is specified in step S301 from the photographed image acquired in step S302. This search specifies in which position the face of the visit destination user exists in the photographed image acquired in step S302.

Next, in step S304, the seat position specifying unit 154 specifies the seat position of the visit destination user based on a search result in step S303. Specifically, the seat position specifying unit 154 specifies the seat position of the visit destination user based on the position of the face image specified in step S303. Because a photographing range of the camera 500 is in advance defined, it is possible to specify the position of the visit destination user in the floor by specifying the position of the visit destination user in the photographed image by the camera 500.

As described above, the seat position specifying unit 154 may search for the face image of the user which is in advance stored from a photographed image of the space (floor) and may thereby specify the seat position of the user based on the position where the face image is searched for. Note that such specification of the seat position may be performed for another user than the visit destination user. That is, such specification may be performed for an arbitrary user in the floor. Such specification of the seat position is performed, and the seat position of the user can thereby be specified even in a case where the seat position is not in advance defined.

Figure 14:
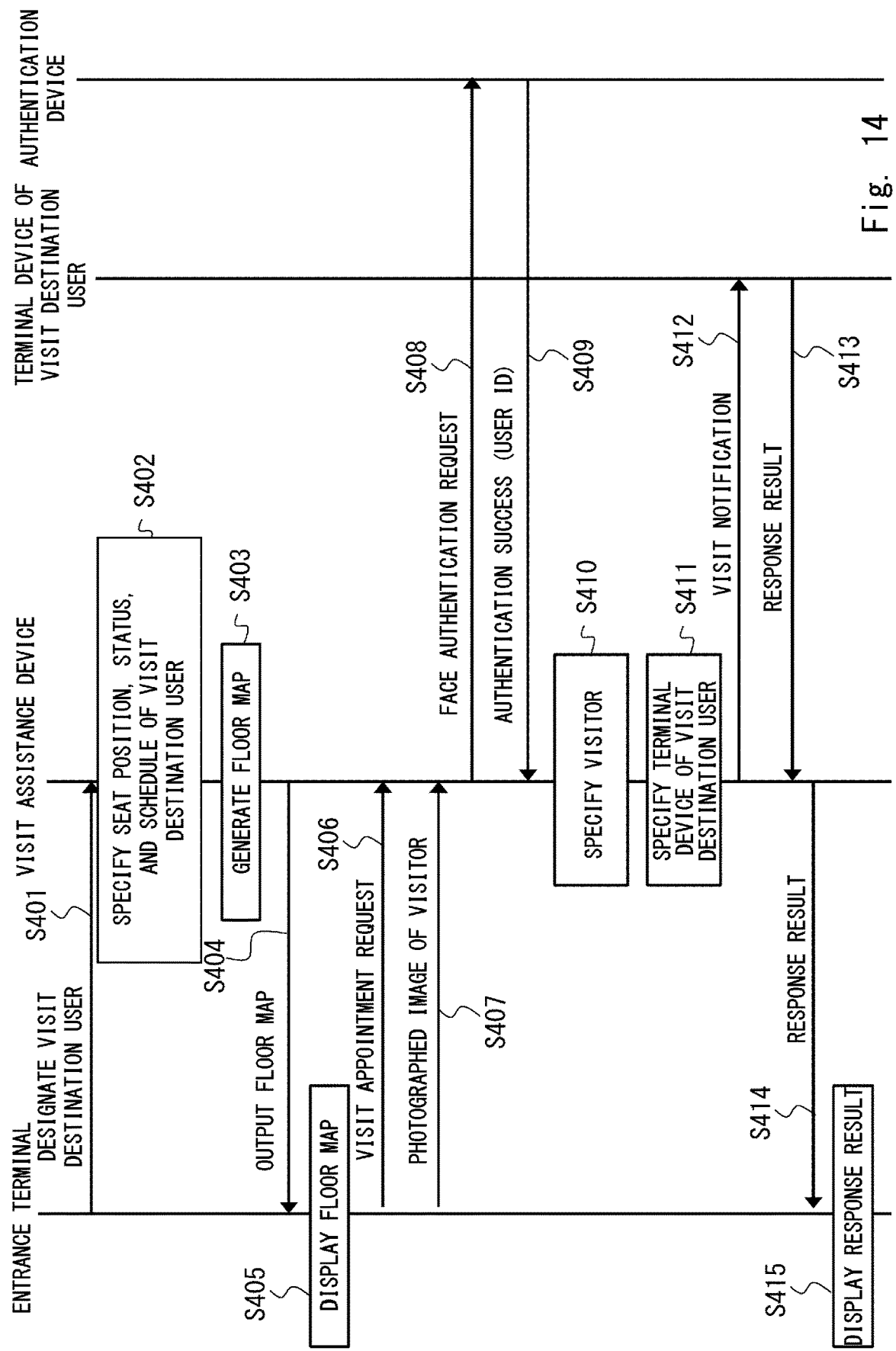
FIG. 14 is a sequence chart illustrating one example of a flow of a process of the visit assistance system according to the second example embodiment.

Next, a flow of a process of the visit assistance system 10 will be described. FIG. 14 is a sequence chart illustrating one example of a flow of a process of the visit assistance system 10 according to the second example embodiment. In the following, the flow of the process will be described with reference to FIG. 14. Note that it is assumed that in the sequence chart illustrated in FIG. 14 and sequence charts which are illustrated in the other drawings and will be described later, the status and the schedule of each user is already registered by the process by the registration unit 151. Similarly, it is assumed that in the sequence chart illustrated in FIG. 14 and the sequence charts which are illustrated in the other drawings and will be described later, the face information DB 210 of the authentication device 200 in advance stores the user IDs 211 and the face feature information 212 about various users.

When a visitor comes to the entrance of the floor, the visitor performs an input to designate the visit destination user to the entrance terminal 300. In step S401, this input information is transmitted from the entrance terminal 300 to the visit assistance device 100. Accordingly, the visit destination acquisition unit 152 acquires the visit destination user.

Next, in step S402, the seat position specifying unit 154 of the visit assistance device 100 specifies the seat position in which the user is seated in the floor. In particular, the seat position specifying unit 154 specifies the seat position of the visit destination user who is acquired by the visit destination acquisition unit 152. Further, the status specifying unit 155 of the visit assistance device 100 specifies the status and the schedule of the user. In particular, the status specifying unit 155 specifies the status and the schedule of the visit destination user.

Next, in step S403, the display control unit 157 generates the floor map which indicates the seat position, the status and the schedule of the visit destination user together with the face image of the visit destination user. Then, in step S404, the display control unit 157 performs control so as to output the generated floor map to the entrance terminal 300 and to cause the display unit 320 of the entrance terminal 300 to display the generated floor map. In this case, the display control unit 157 causes the display unit 320 to also display the user interface image for accepting a visit appointment. Accordingly, in step S405, the display unit 320 of the entrance terminal 300 performs display of the floor map such as display illustrated in FIG. 9.

Next, the visitor makes a visit appointment to meet with the visit destination user. Specifically, the visitor performs an operation of touching the user interface image or the like and thereby inputs an instruction of a visit appointment to the entrance terminal 300. Accordingly, in step S406, a visit appointment request is transmitted from the entrance terminal 300 to the visit assistance device 100. Further, in step S407, an image which is photographed by the camera 310 of the entrance terminal 300 and includes the face of the visitor is transmitted from the entrance terminal 300 to the visit assistance device 100.

Next, in step S408, the authentication control unit 156 of the visit assistance device 100 transmits the face authentication request, which includes the image obtained in step S407, to the authentication device 200. Then, in step S409, the visit assistance device 100 receives an authentication result from the authentication device 200. In this sequence chart, a description will be made on the assumption that the face authentication succeeds. That is, in step S409, the visit assistance device 100 receives an authentication result that the face authentication has succeeded and the user ID of the authenticated person from the authentication device 200. Note that in a case where the face authentication has failed, the display control unit 157 may perform control such that the display unit 320 of the entrance terminal 300 displays the fact that the authentication has failed. Further, in a case where the face authentication has failed, a notification to the terminal device 400 by the notification unit 158 is not performed.

Next, in step S410, the notification unit 158 of the visit assistance device 100 refers to the authentication result obtained in step S409 and specifies the visitor. The notification unit 158 may specify the visitor by the user ID or may specify the visitor by the name which is in advance related with the user ID. Further, in step S411, the notification unit 158 refers to the terminal ID 116 of the terminal information 115 stored in the storage unit 110 and thereby specifies the terminal device 400 used by the visit destination user.

Next, in step S412, the notification unit 158 performs a notification about the visit to the terminal device 400 used by the visit destination user. For example, the notification unit 158 notifies the terminal device 400 of an occurrence of a request for a visit appointment together with information identifying the visitor (for example, the user ID or name). Accordingly, for example, the terminal device 400 performs display as illustrated in FIG. 10. As described above, in the present example embodiment, the notification unit 158 performs a notification in a case where the face authentication succeeds, but practice of a notification may not have to be limited to a case where the face authentication succeeds. That is, a notification may be performed regardless of a result of the face authentication.

To handle this, the visit destination user inputs whether or not the visit is permitted to the terminal device 400. In step S413, a response result as the input content is transmitted from the terminal device 400 to the visit assistance device 100. Then, in step S414, the response result is transmitted from the visit assistance device 100 to the entrance terminal 300. Then, in step S415, the response result is displayed on the entrance terminal 300. Accordingly, for example, display as illustrated in FIG. 11 or FIG. 12 is performed in the entrance terminal 300.

In the above, the second example embodiment is described. In the present example embodiment, the status in the seated condition of the user is registered, and the registered status is displayed by the entrance terminal 300. Thus, a visitor checks the status at the entrance and can thereby obtain criteria about whether or not the visit destination user is presently capable of reception for a visit. Accordingly, at a preferable timing for the visit destination user, the visitor is capable of meeting with the visit destination user, and realization of a comfortable visit can thereby be assisted.

Third Example Embodiment

Next, a third example embodiment will be described. In the description about the second example embodiment, in the sequence chart illustrated in FIG. 14, the face authentication is performed to use an authentication result as a condition for performing a notification to the terminal device 400. Meanwhile, in the present example embodiment, the face authentication is performed to use an authentication result as a condition for performing display of the floor map. A configuration of the visit assistance system 10 according to the present example embodiment is similar to that according to the second example embodiment. In the following, a description will be made about points different from the above-described example embodiments, and repeated descriptions will appropriately be omitted.

Figure 15:
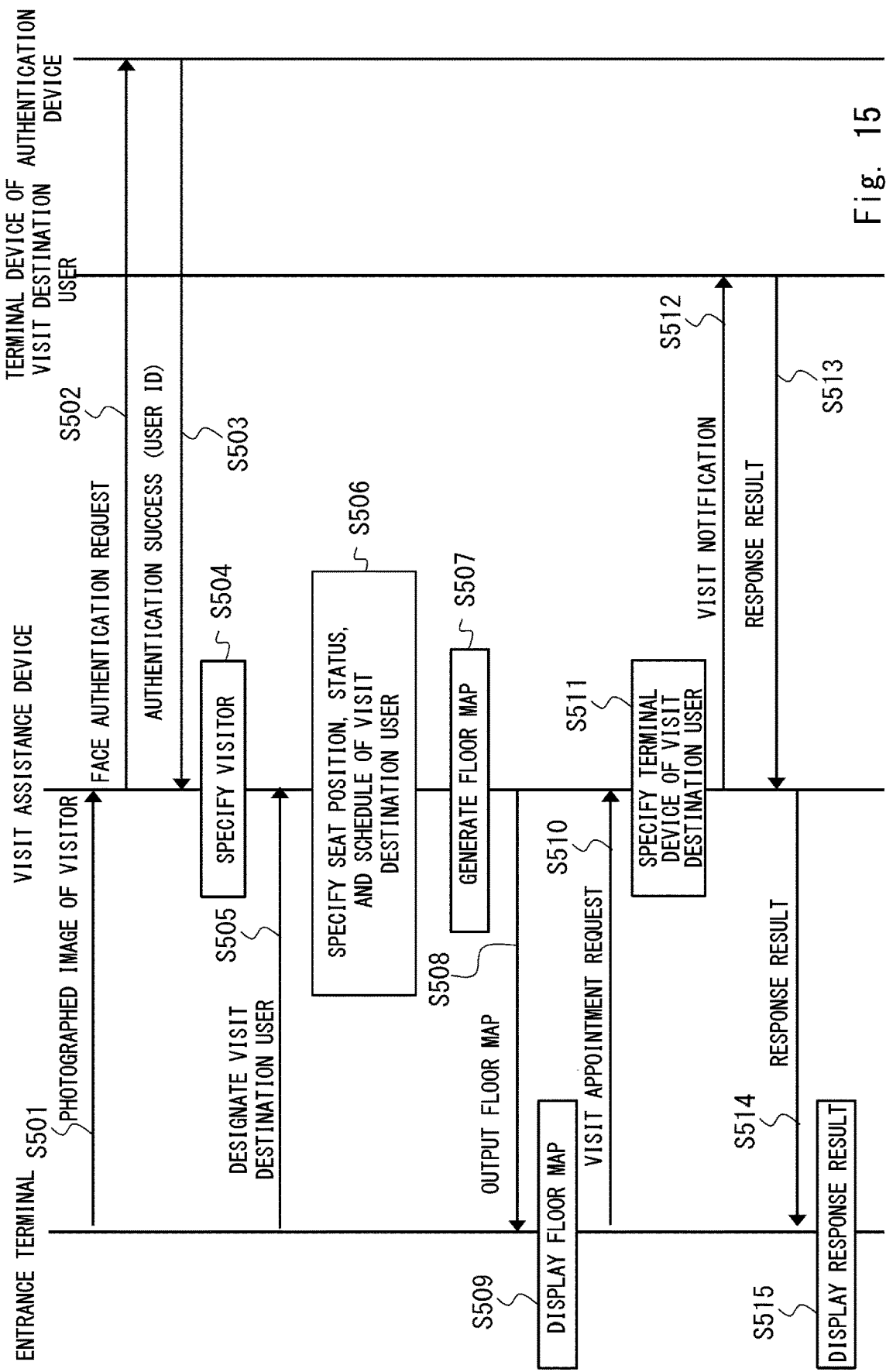
FIG. 15 is a sequence chart illustrating one example of a flow of a process of a visit assistance system according to a third example embodiment.

FIG. 15 is a sequence chart illustrating one example of a flow of a process of the visit assistance system 10 according to the third example embodiment. In the following, the flow of the process in the present example embodiment will be described with reference to FIG. 15.

When a visitor comes to the entrance of the floor, in step S501, an image which is photographed by the camera 310 of the entrance terminal 300 and includes the face of the visitor is transmitted from the entrance terminal 300 to the visit assistance device 100.

Next, in step S502, the authentication control unit 156 of the visit assistance device 100 transmits the face authentication request, which includes the image obtained in step S501, to the authentication device 200. Then, in step S503, the visit assistance device 100 receives an authentication result from the authentication device 200. In this sequence chart, a description will be made on the assumption that the face authentication succeeds. That is, in step S503, the visit assistance device 100 receives an authentication result that the face authentication has succeeded and the user ID of the authenticated person from the authentication device 200. Note that in the present example embodiment also, in a case where the face authentication has failed, the display control unit 157 may perform control such that the display unit 320 of the entrance terminal 300 displays the fact that the authentication has failed. Further, in a case where the face authentication has failed, display of the floor map in the entrance terminal 300 is not performed. That is, display of the seat position, the status and the schedule of the user is not performed.

Next, in step S504, the notification unit 158 of the visit assistance device 100 refers to the authentication result obtained in step S503 and specifies the visitor.

Next, in step S505, the visitor performs an input to designate the visit destination user to the entrance terminal 300, and this input information is transmitted from the entrance terminal 300 to the visit assistance device 100.

Next, in step S506, the seat position specifying unit 154 of the visit assistance device 100 specifies the seat position in which the user is seated in the floor. In particular, the seat position specifying unit 154 specifies the seat position of the visit destination user. Further, the status specifying unit 155 of the visit assistance device 100 specifies the status and the schedule of the user. In particular, the status specifying unit 155 specifies the status and the schedule of the visit destination user.

Next, in step S507, the display control unit 157 generates the floor map which indicates the seat position, the status and the schedule of the visit destination user together with the face image of the visit destination user. Then, in step S508, the display control unit 157 performs control so as to output the generated floor map to the entrance terminal 300 and to cause the display unit 320 of the entrance terminal 300 to display the generated floor map. In this case, the display control unit 157 causes the display unit 320 to also display the user interface image for accepting a visit appointment. Accordingly, in step S509, the display unit 320 of the entrance terminal 300 performs display of the floor map such as display illustrated in FIG. 9. As described above, in the sequence illustrated in FIG. 15, in a case where the face authentication of the visitor has succeeded, the display control unit 157 causes the display unit 320 to display the seat position, the status and the schedule of the user. Thus, those can be concealed from the visitor who fails in authentication.

Next, the visitor performs an operation for making a visit appointment by the entrance terminal 300. Accordingly, in step S510, a visit appointment request is transmitted from the entrance terminal 300 to the visit assistance device 100.

Next, in step S511, the notification unit 158 refers to the terminal ID 116 of the terminal information 115 stored in the storage unit 110 and thereby specifies the terminal device 400 used by the visit destination user.

Next, in step S512, the notification unit 158 performs a notification about the visit to the terminal device 400 used by the visit destination user. To handle this, the visit destination user inputs whether or not the visit is permitted to the terminal device 400. In step S513, a response result as the input content is transmitted from the terminal device 400 to the visit assistance device 100. Then, in step S514, this response result is transmitted from the visit assistance device 100 to the entrance terminal 300. Then, in step S515, the response result is displayed on the entrance terminal 300.

In the present example embodiment, the face authentication is performed before display of the floor map. Thus, it is possible to display the floor map only in a case where the face authentication has succeeded. Thus, the floor map can be concealed from the visitor who fails in authentication. Further, in the present example embodiment, the face authentication is performed before a notification. Consequently, in the present example embodiment also, the notification can be made not to be performed for a visit by a visitor who fails in authentication. Thus, the visit destination user can be inhibited from being disturbed by a notification of a visit of such a visitor.

Incidentally, in a case where the face authentication of the visitor is performed before display of the status, display of a different status may be performed in accordance with the visitor. For example, the display control unit 157 may display the status of "capable of reception" in a case where the visitor is a superior of the user and may display the status of "incapable of reception" in a case where the visitor is a subordinate of the user. In this case, the registration unit 151 registers a status for each kind of visitors for the same user. That is, the registration unit 151 registers plural kinds of statuses as statuses of the same user. Then, the display control unit 157 causes the display unit 320 to display the status corresponding to the kind of visitor which is distinguished by the result of the face authentication of the visitor. The display control unit 157 distinguishes the kind of visitor by referring to the personal information of a person authenticated by the face authentication, for example. When the user registers a status, the user inputs an arbitrary status for each of the kinds of visitors.

Here, it is possible to use arbitrary kinds as the kinds of visitors. For example, as the kinds of visitors, kinds categorized in view of official positions, sexes, ages, or departments to which visitors belong can be used. Note that those are only examples, and kinds categorized in other views may be used.

As described above, the status corresponding to the kind of visitor is displayed, and convenience for the user can further be improved.

Note that when the user registers a status, instead of inputting respective statuses for the kinds of visitors, the user may perform an input for setting targets for whom the status of "capable of reception" is displayed. For example, the user may perform an input for designating attributes (such as official positions, sexes, ages, or departments to which visitors belong) of visitors as targets for whom the status of "capable of reception" is displayed. In this case, the registration unit 151 registers the status of "capable of reception" as the status for the visitor who corresponds to the designated attribute and registers the status of "incapable of reception" as the status for the visitor who does not correspond to that. Accordingly, the display control unit 157 displays the status of "capable of reception" in a case where the visitor corresponds to the designated attribute and displays the status of "incapable of reception" in a case where the visitor does not correspond to that. Similarly, when the user registers a status, instead of inputting respective statuses for the kinds of visitors, the user may perform an input for setting targets for whom the status of "incapable of reception" is displayed. For example, the user may perform an input for designating attributes (such as official positions, sexes, ages, or departments to which visitors belong) of visitors as targets for whom the status of "incapable of reception" is displayed. In this case, the registration unit 151 registers the status of "incapable of reception" as the status for the visitor who corresponds to the designated attribute and registers the status of "capable of reception" as the status for the visitor who does not correspond to that. Accordingly, the display control unit 157 displays the status of "incapable of reception" in a case where the visitor corresponds to the designated attribute and displays the status of "capable of reception" in a case where the visitor does not correspond to that.

Further, the user may individually designate a person (user) as a target for whom the status of "capable of reception" is displayed. In this case, the registration unit 151 registers the status of "capable of reception" as the status for the designated person and registers the status of "incapable of reception" as the status for other persons than the designated person. Accordingly, the display control unit 157 displays the status of "capable of reception" in a case where the visitor is the designated person and displays the status of "incapable of reception" in an otherwise case. Note that the user may individually designate a person (user) as a target for whom the status of "incapable of reception" is displayed. In this case, the registration unit 151 registers the status of "incapable of reception" as the status for the designated person and registers the status of "capable of reception" as the status for other persons than the designated person. Accordingly, the display control unit 157 displays the status of "incapable of reception" in a case where the visitor is the designated person and displays the status of "capable of reception" in an otherwise case.

Further, the designated person may be one person or plural persons.

Further, the user may perform an input for setting a boundary condition about switching of display of statuses. In this case, for example, the user may perform an input for specifically designating official positions, departments to which visitors belong, ages, or the like as boundary conditions for the switching. In this case, the registration unit 151 registers the status of "capable of reception" as the status for the visitor with a higher or equivalent attribute than the set official positions, the set departments to which visitors belong, or the set ages. Further, the registration unit 151 registers the status of "incapable of reception" as the status for the visitor with a lower attribute. Accordingly, for example, in a case where the user sets an official position of "section chief" as the boundary condition for the switching, the display control unit 157 displays the status of "capable of reception" in a case where the visitor is in an official position of a section chief or higher. On the other hand, in a case where the visitor is not in an official position of a section chief or higher, the display control unit 157 displays the status of "incapable of reception". Further, for example, in a case where the user sets a department of "sales department" as the boundary condition for the switching, the display control unit 157 displays the status of "capable of reception" in a case where the visitor belongs to the sales department or a department at a higher rank. On the other hand, in a case where the visitor belongs to another department than those, the display control unit 157 displays the status of "incapable of reception". Further, for example, in a case where the user sets an age of "40 years old" as the boundary condition for the switching, the display control unit 157 displays the status of "capable of reception" in a case where the visitor is 40 years old or older and displays the status of "incapable of reception" in an otherwise case.

Modification Example of Third Example Embodiment

In the above-described third example embodiment, display of the floor map is performed in accordance with the authentication result. As for this, the following modification example is possible.

Figure 16:
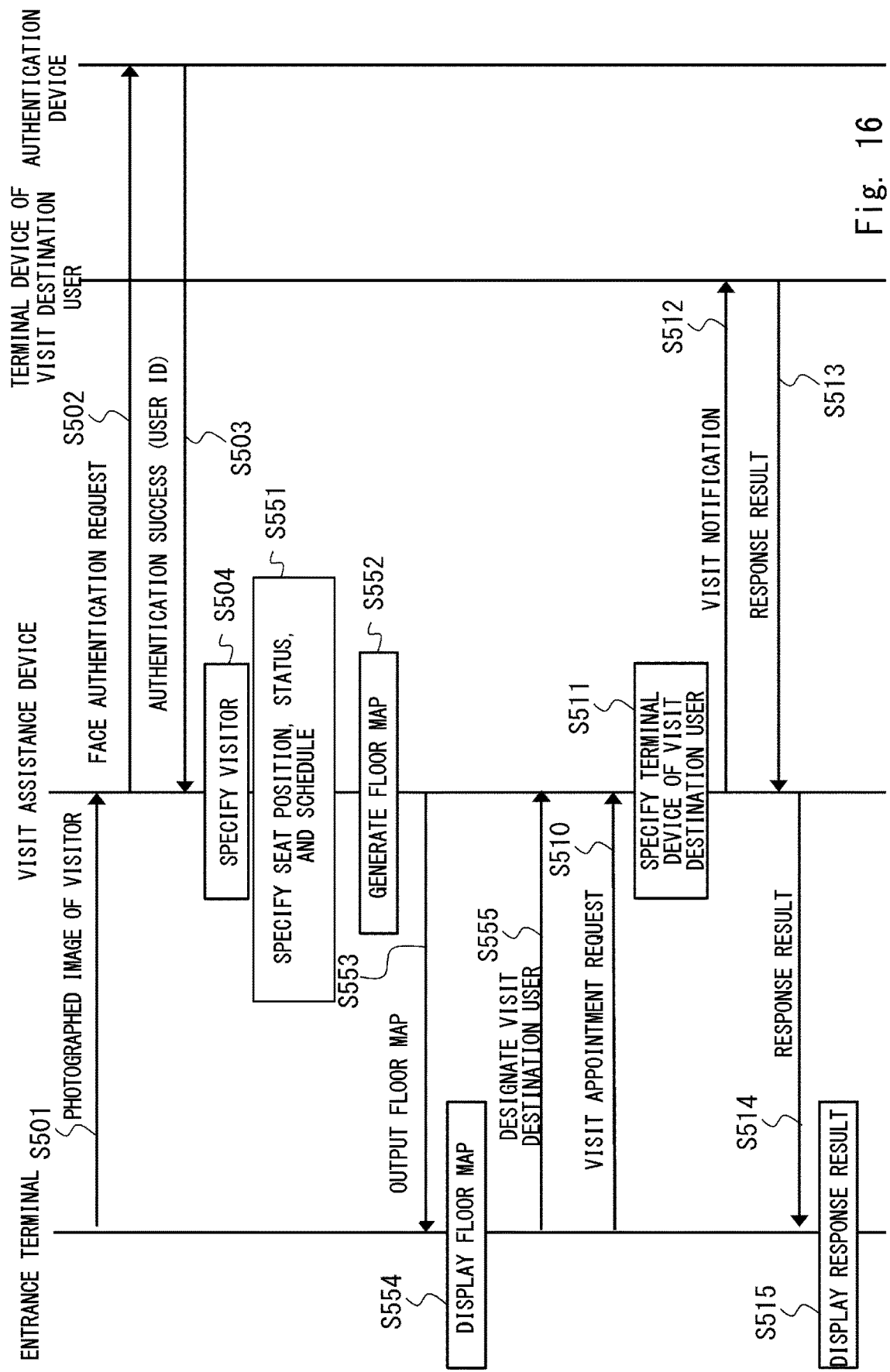
FIG. 16 is a sequence chart illustrating one example of a flow of a process of a visit assistance system according to a modification example.

FIG. 16 is a sequence chart illustrating one example of a flow of a process of the visit assistance system 10 according to the modification example. The present modification example is different from the sequence chart illustrated in FIG. 15 in the point that display of the floor map is performed before designation of the visit destination user. In the following, the flow of the process in the present modification example will be described with reference to FIG. 16.

Because the flow of the first steps in the sequence chart, that is, the flow of step S501 to S504 is the same as the flow illustrated in FIG. 15, a description thereof will not be made. Note that in the present modification example also, in a case where the face authentication has failed, the display control unit 157 may perform control such that the display unit 320 of the entrance terminal 300 displays the fact that the authentication has failed. Further, in a case where the face authentication has failed, display of the floor map in the entrance terminal 300 is not performed. That is, display of the seat position, the status and the schedule of the user is not performed.

In this sequence chart, after step S504, the process moves to step S551.

In step S551, the seat position specifying unit 154 of the visit assistance device 100 specifies the seat position in which the user is seated in the floor. Further, the status specifying unit 155 of the visit assistance device 100 specifies the status and the schedule of the user.

Next, in step S552, the display control unit 157 generates the floor map which indicates the seat position, the status and the schedule of the user in the floor together with the face image of the user. In this case, the display control unit 157 may generate a floor map which indicates the seat positions or the like of all users in the floor or may change the users in the floor as display targets of the seat positions or the like in accordance with the authenticated visitor. For example, the display control unit 157 may display the seat position or the like of only the user related to the visitor specified in step S504. Then, in step S553, the display control unit 157 performs control so as to output the generated floor map to the entrance terminal 300 and to cause the display unit 320 of the entrance terminal 300 to display the generated floor map. Accordingly, in step S554, the display unit 320 of the entrance terminal 300 performs display of the floor map.

Next, in step S555, the visitor performs an input to designate the visit destination user to the entrance terminal 300, and this input information is transmitted from the entrance terminal 300 to the visit assistance device 100. In this case, the visitor may perform an operation (such as an operation of touching an image, for example) of selecting the face image of the user which is displayed on the floor map in order to designate the visit destination user. After step S555, the process moves to step S510 which is described with reference to FIG. 15. Because the processes in step S510 and subsequent steps are similar to the sequence chart in FIG. 15, a description thereof will not be made.

In the above, the modification example is described. In the present modification example, the face authentication is performed before display of the floor map. Thus, it is possible to display the floor map only in a case where the face authentication has succeeded. In particular, in the present modification example, because the floor map is displayed before the visitor designates the visit destination user, the visitor can designate the visit destination user by referring to the floor map.

Fourth Example Embodiment

Next, a fourth example embodiment will be described. The present example embodiment is different from the above-described example embodiments in the point that the visit destination user is specified by using conference information. In the following, a description will be made about configurations and processes different from the above-described example embodiments, and repeated descriptions will appropriately be omitted.

Figure 17:
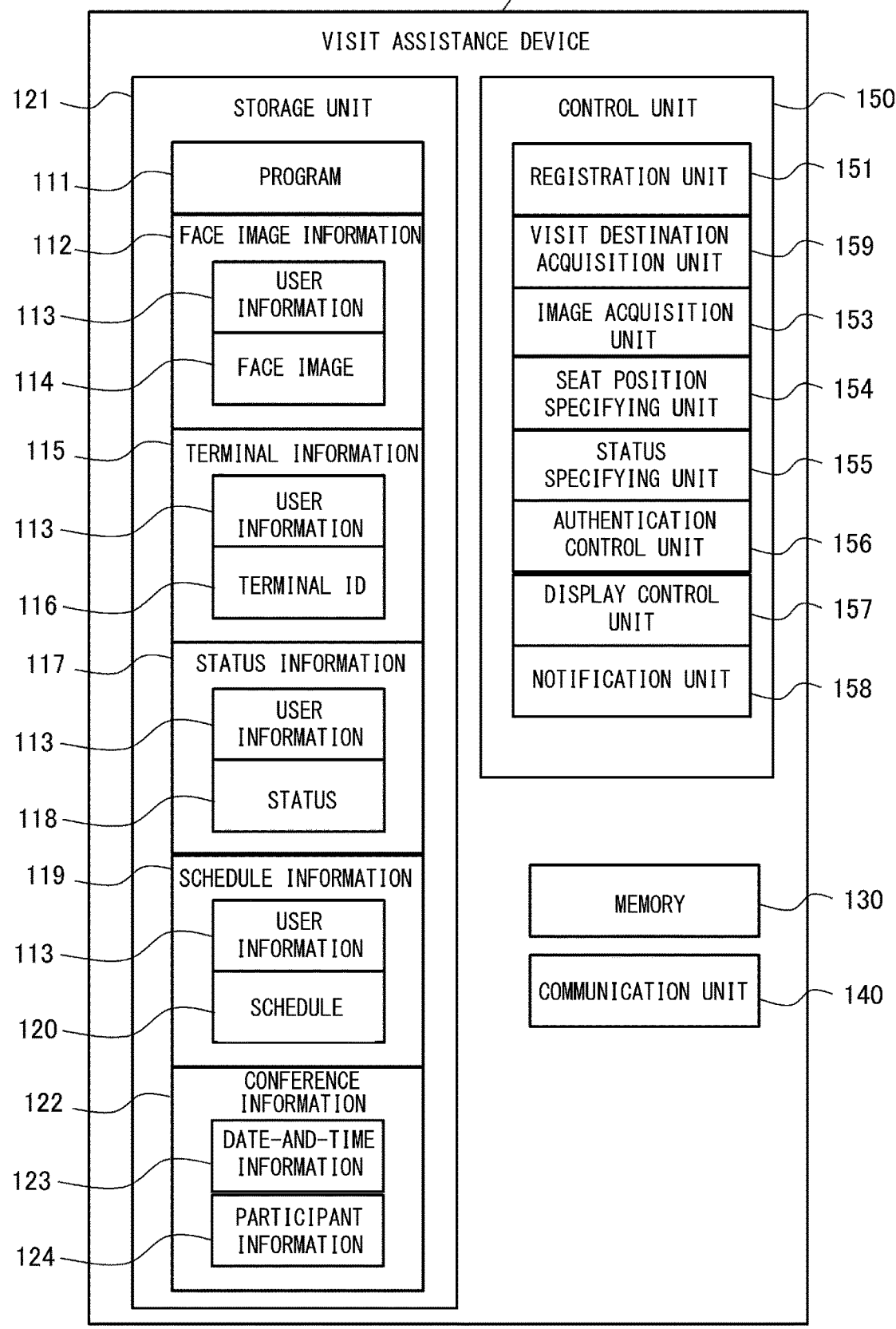
FIG. 17 is a block diagram illustrating a configuration of a visit assistance device according to a fourth example embodiment.

FIG. 17 is a block diagram illustrating a configuration of a visit assistance device 101 according to a fourth example embodiment. The visit assistance device 101 according to the fourth example embodiment is different from the visit assistance device 100 in the point that the visit assistance device 101 has a storage unit 121 instead of the storage unit 110 and a visit destination acquisition unit 159 instead of the visit destination acquisition unit 152. The storage unit 121 stores conference information 122 in addition to the program 111, the face image information 112, the terminal information 115, the status information 117, and the schedule information 119.

The conference information 122 is information which indicates a planned conference and includes date-and-time information 123 and participant information 124. In the conference information 122, for each conference, the date-and-time information 123 and the participant information 124 are associated together. The date-and-time information 123 is information which indicates a date and time when a conference is held. Further, the participant information 124 is information which specifies participating members in a conference. The participant information 124 may be the user IDs of users who participate in a conference. The conference information 122 may further include information such as a conference place. As described above, the conference information is information which includes a definition of a date and time when a conference is held and participants in the conference.

The visit destination acquisition unit 159 specifies a participant who participates in a conference at the same date and time together with the visitor based on the conference information which is in advance stored and acquires the specified participant as the visit destination user. Accordingly, even when the visitor does not explicitly designate the visit destination user, the visit destination user can be specified. Note that in a case where the conference information 122 includes information of the conference place, the visit destination acquisition unit 159 may specify a participant in a conference held at the same date and time and at the same place and may thereby acquire the specified participant as the visit destination user.

Further, the visit destination acquisition unit 159 may refer to the conference information 122, among pieces of stored conference information 122, in which the time difference between the date and time when the conference is held and the date and time when a visitor visits the entrance is within a predetermined range and may thereby specify the visit destination user. For example, the visit destination acquisition unit 159 may refer to the conference information 122, among pieces of stored conference information 122, about the conference which is held on the same date as the date when a visitor visits the entrance and may thereby specify the visit destination user. In a case where a visit occurs at a date and time which are largely deviated from the date and time when the conference is held, it can be considered that the purpose of the visit is not to see the participant of the conference. That is, it is considered that the visitor comes to see another person than a participant in the conference. Consequently, in such a manner, the visit destination user can more certainly be specified while avoiding explicit designation of the visit destination user by the visitor.

Figure 18:
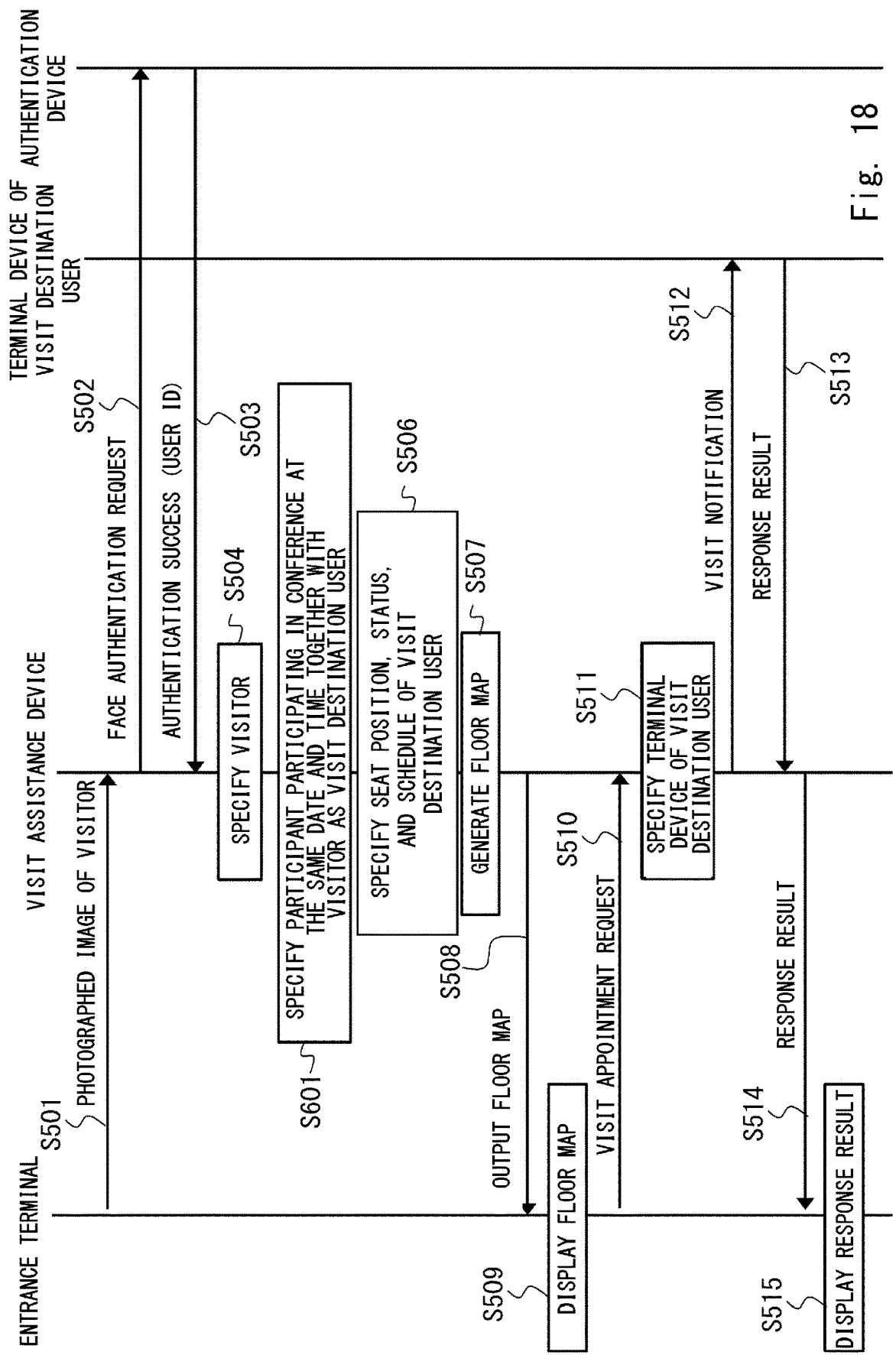
FIG. 18 is a sequence chart illustrating one example of a flow of a process of a visit assistance system according to the fourth example embodiment.

FIG. 18 is a sequence chart illustrating one example of a flow of a process of the visit assistance system 10 according to the fourth example embodiment. In the following, the flow of the process in the present example embodiment will be described with reference to FIG. 18. The sequence chart illustrated in FIG. 18 is different from the sequence chart illustrated in FIG. 15 in the point that step S505 is replaced by step S601. That is, in step S505, the visit destination user is specified based on an input to designate the visit destination user which is input to the entrance terminal 300 by the visitor. Meanwhile, in the present example embodiment, when the visitor is specified in step S504, a process in step S601 is performed.

In step S601, the visit destination acquisition unit 159 performs a specifying process of the visit destination user by using the conference information 122. Specifically, the visit destination acquisition unit 159 specifies the participant who participates in the conference at the same date and time together with the visitor specified in step S504 by referring to the conference information. Then, the visit destination acquisition unit 159 sets the specified participant as the visit destination user. As described above, in a case where the face authentication of the visitor has succeeded, the visit destination acquisition unit 159 specifies the participant who participates in the conference at the same date and time together with the visitor based on the conference information which is in advance stored and includes the definition of the date and time when the conference is held and the participant in the conference and acquires the specified participant as the visit destination user. After step S601, the process moves to step S506. The processes in step S506 and subsequent steps are described with reference to FIG. 15 and will thus not be described here.

In the above, the fourth example embodiment is described. As described above, in the present example embodiment, the visit destination user is specified by using the conference information 122. Thus, even when the visitor does not explicitly designate the visit destination user, the visit destination user can be specified.

Fifth Example Embodiment

In the description in the second example embodiment, a description is made about specification of a seat position by using a photographed image by the camera 500 which photographs the space (floor). In the present example embodiment, a description will be made about another method of specifying a seat position of a user in the space (floor).

Figure 19:
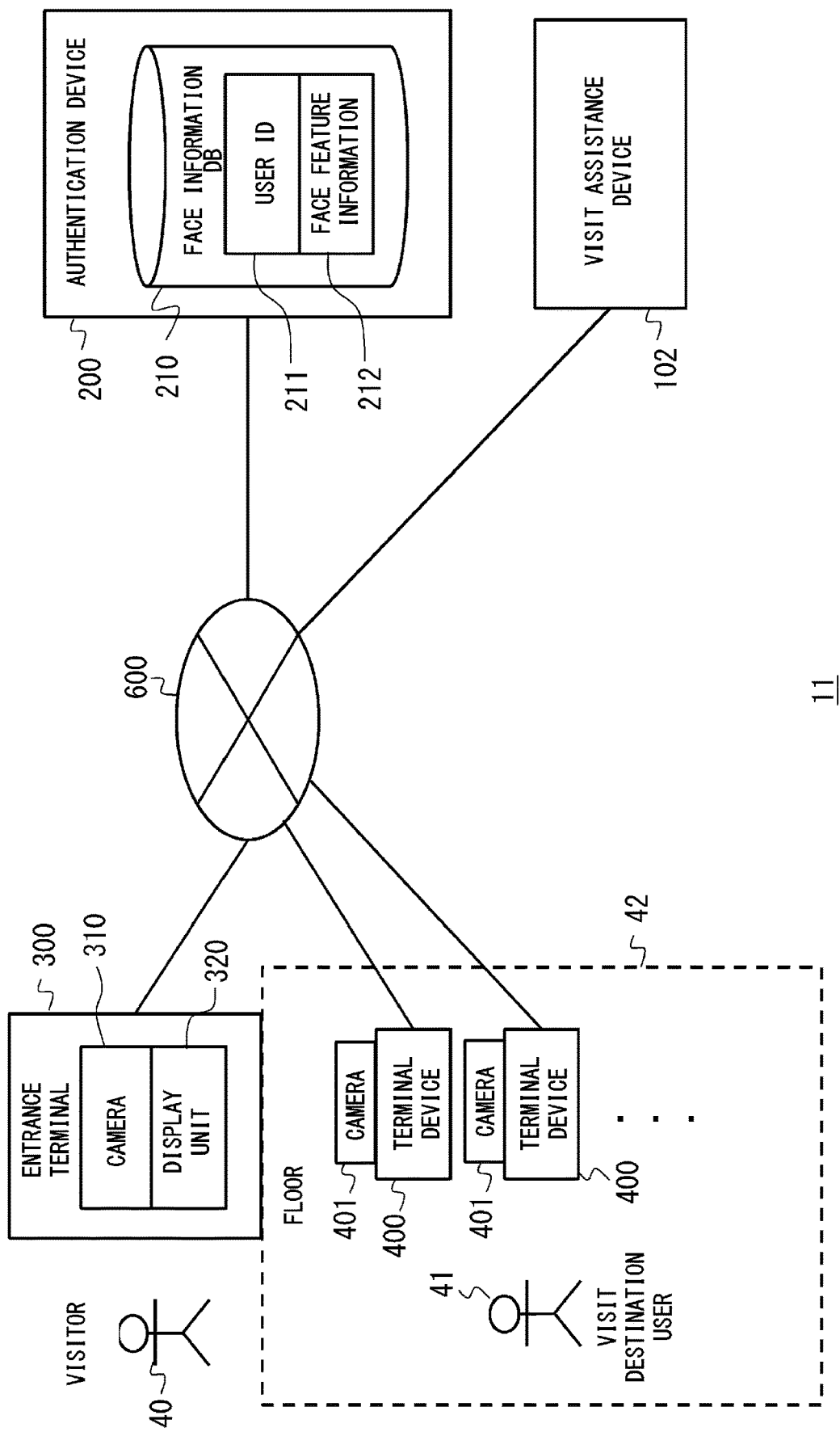
FIG. 19 is a block diagram illustrating a configuration of a visit assistance system according to a fifth example embodiment.

FIG. 19 is a block diagram illustrating a configuration of a visit assistance system 11 according to a fifth example embodiment. In the present example embodiment, each terminal device 400 includes a camera 401 which photographs the face of a user who uses the terminal device 400. Note that as illustrated in FIG. 19, in the present example embodiment, the camera 500 which is illustrated in FIG. 3 and photographs the floor may be omitted. Further, the visit assistance system 11 includes a visit assistance device 102 instead of the visit assistance device 100. In the present example embodiment, it is assumed that an installation position of the terminal device 400 is in advance defined in the space.

Figure 20:
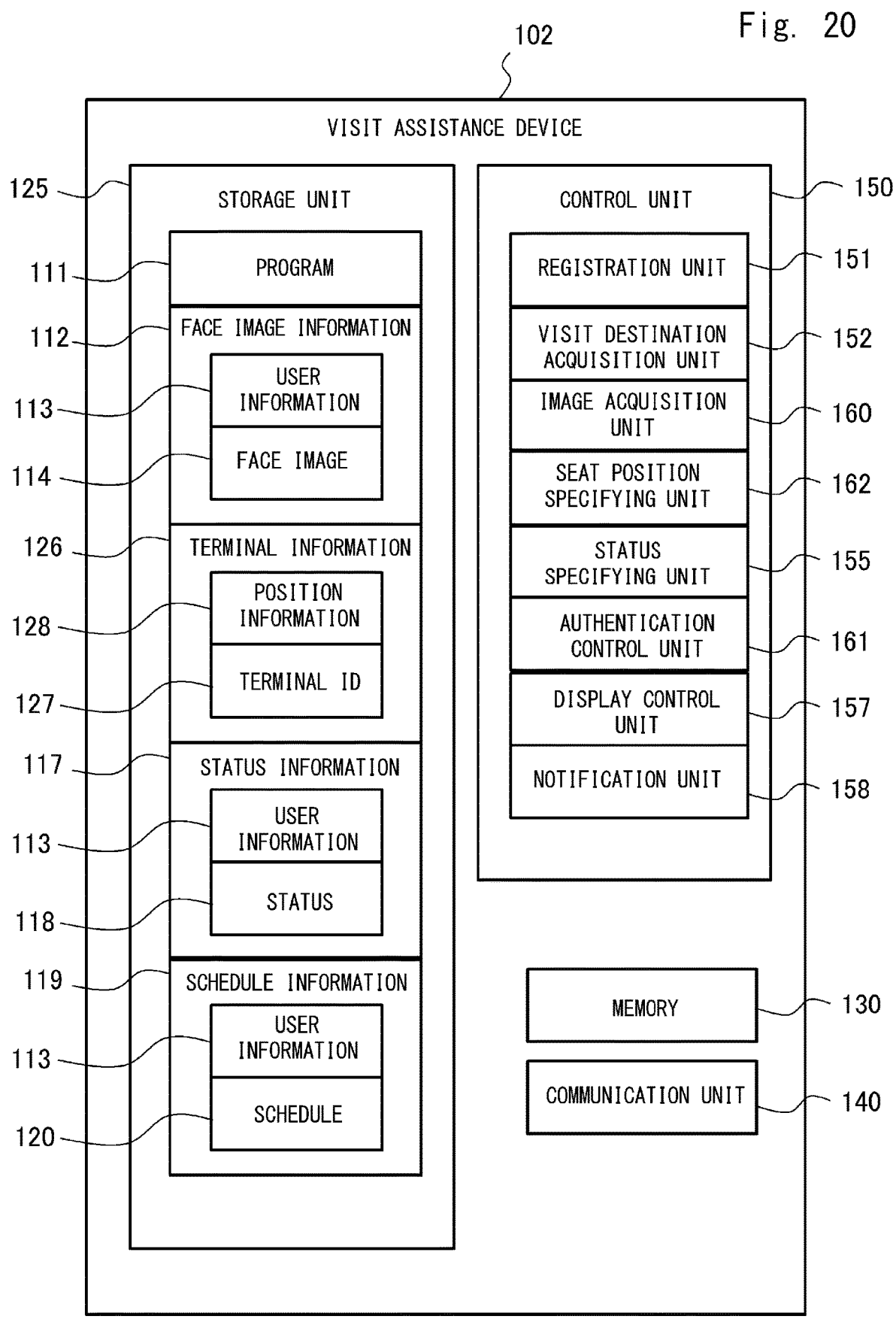
FIG. 20 is a block diagram illustrating a configuration of a visit assistance device according to the fifth example embodiment.

FIG. 20 is a block diagram illustrating a configuration of the visit assistance device 102 according to the fifth example embodiment. The visit assistance device 102 is different from the visit assistance device 100 in the following points. That is, the visit assistance device 102 has a storage unit 125 instead of the storage unit 110, an image acquisition unit 160 instead of the image acquisition unit 153, an authentication control unit 161 instead of the authentication control unit 156, and a seat position specifying unit 162 instead of the seat position specifying unit 154.

The storage unit 125 is different from the storage unit 110 in the point that the storage unit 125 stores terminal information 126 instead of the terminal information 115. The terminal information 126 is position information which indicates the installation position of each of the terminal devices 400. The terminal information 126 is information in which a terminal ID 127 identifying the terminal device 400 is associated with position information 128 of the terminal device 400.

The image acquisition unit 160 acquires, via the network 600, a photographed image of a visitor by the camera 310 of the entrance terminal 300 and a photographed image, of the user who uses the terminal device 400, by the camera 401 of the terminal device 400. Note that for convenience of description, the block diagram illustrated in FIG. 20 illustrates one image acquisition unit 160, but the visit assistance device 102 may include, as configurations, two image acquisition units which are an image acquisition unit acquiring an image by the camera 310 and an image acquisition unit acquiring an image by the camera 401.

In addition, the authentication control unit 161 is different from the above-described authentication control unit 156 in the point that the authentication control unit 161 performs control so as to perform the face authentication of the user who uses the terminal device 400 based on the photographed image of the user of the terminal device 400, which is photographed by the camera 401 of the terminal device 400. Note that for convenience of description, the block diagram illustrated in FIG. 20 illustrates one authentication control unit 161. However, the visit assistance device 102 may include, as configurations, two authentication control units that are an authentication control unit which performs control so as to perform the face authentication of a visitor and an authentication control unit which performs control so as to perform the face authentication of the user who uses the terminal device 400.

In a case where the face authentication by the image photographed by the camera 401 succeeds, the user who uses the terminal device 400 can be specified. Thus, when a result of authentication success is obtained for the face authentication by the image photographed by the camera 401 of a certain terminal device 400, the seat position specifying unit 162 specifies the terminal device 400 as the terminal device 400 which is used by the user specified by the authentication result. Accordingly, the information corresponding to the terminal information 115 illustrated in FIG. 8 can be obtained. That is, information can be obtained in which the user information including information identifying the user is associated with the terminal ID identifying the terminal device 400 used by the user. This information is stored in the storage unit 125. Next, the seat position specifying unit 162 refers to the terminal information 126 and specifies the installation position of the terminal device 400 used by the user who is specified by the authentication result. The seat position specifying unit 162 sets this installation position as the seat position of the user. As described above, in a case where the face authentication of the user who uses the terminal device 400 has succeeded, the seat position specifying unit 162 specifies the installation position of the terminal device 400 as the seat position of the user.

Figure 21:
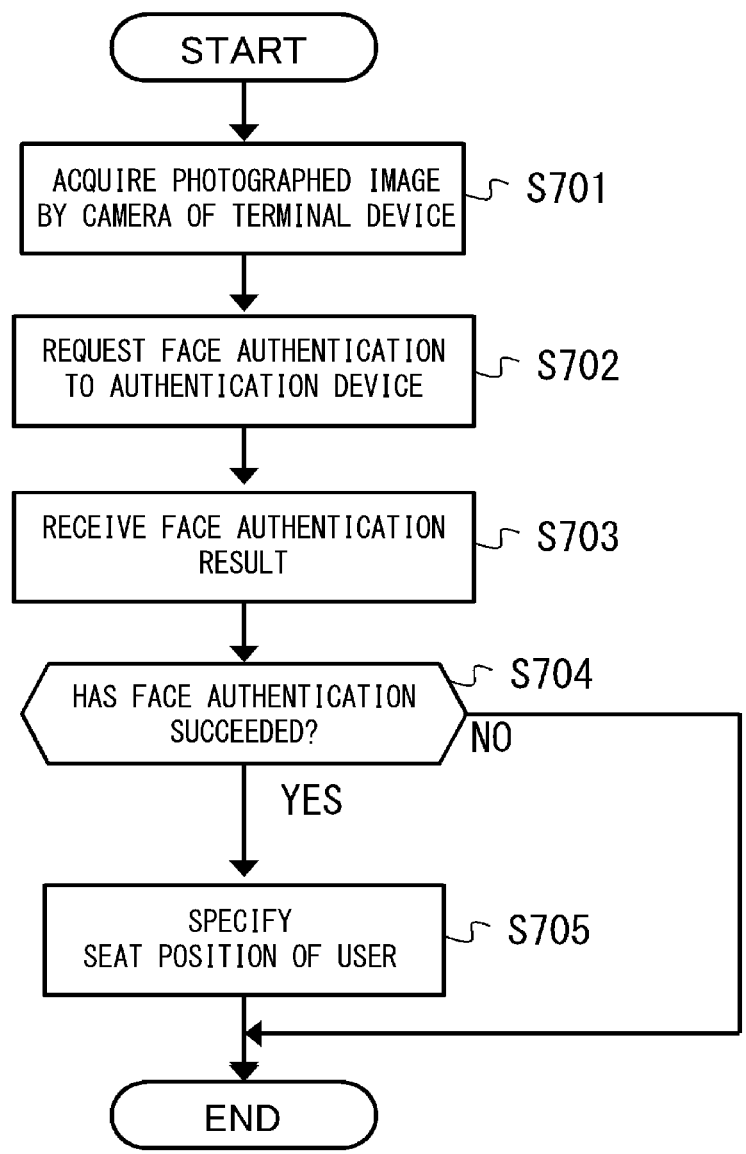
FIG. 21 is a flowchart illustrating a flow of a process of specifying a seat position by using a photographed image by a camera of a terminal device.

FIG. 21 is a flowchart illustrating a flow of a process of specifying the seat position by using a photographed image by the camera 401 of the terminal device 400. In the following, the flow of the process will be described along FIG. 21.

First, in step S701, the image acquisition unit 160 of the visit assistance device 102 acquires a photographed image by the camera 401 of the terminal device 400 via the network 600. That is, the image acquisition unit 160 acquires an image in which the face of the user who uses the terminal device 400 is photographed.

Next, in step S702, the authentication control unit 161 transmits the face authentication request, which includes the image acquired in step S701, to the authentication device 200. Then, in step S703, the authentication control unit 161 receives a face authentication result from the authentication device 200. In a case where the face authentication has succeeded (YES in step S704), the process moves to step S705. In step S705, as described above, the seat position specifying unit 162 specifies the seat position of the user. On the other hand, in a case where the face authentication has failed (NO in step S704), the process of specifying the seat position is finished.

As described above, the seat position specifying unit 162 specifies the seat position of the user based on the authentication result of the image photographed by the camera 401. Such specification of the seat position is performed, and the seat position of the user can thereby be specified even in a case where the seat position is not in advance defined.

In the above, various example embodiments are described. The processes described in those example embodiments can be realized with a computer which includes a processor and software (computer program) including one or more commands to be executed by this processor. That is, this processor reads out the software (computer program) from a memory and executes the software, and the processes described in the example embodiments can thereby be performed.

Note that the above-described program can be stored by using various types of non-transitory computer-readable media and can be supplied to a computer. Non-transitory computer-readable media include various types of tangible recording media (tangible storage media). Examples of non-transitory computer readable media may include magnetic recording media (for example, a flexible disc, a magnetic tape, and a hard disk drive), magneto-optical recording media (for example, a magneto-optical disk), a CD-ROM (read-only memory), a CD-R, a CD-R/W, and semiconductor memories (for example, a mask ROM, a PROM (programmable ROM), an EPROM (erasable PROM), a flash ROM, and a RAM (random access memory)). Further, the program may be supplied to a computer by various types of transitory computer-readable media. Examples of transitory computer-readable media may include an electric signal, an optical signal, and an electromagnetic wave. A transitory computer-readable medium can supply the program to a computer via a wired communication path such as an electric wire or an optical fiber or a wireless communication path.

Further, as for the above-described example embodiments, various modification examples are possible. For example, in the above-described example embodiments, a description is made on the assumption that the authentication device 200 is a device separate from the visit assistance device 100, 101, or 102; however, the authentication device 200 may be built in the visit assistance device 100, 101, or 102. That is, functions of the authentication device 200 may be included in the visit assistance device 100, 101, or 102. Further, in the above-described example embodiments, the notification unit 158 performs a notification about a visit to the terminal device 400 installed in a seat; however, a notification may be performed to a terminal device which is carried by the user such as a smartphone or a tablet terminal. Further, in the above-described example embodiments, in a portion of the processes, success in the face authentication is set as an execution condition for the processes; however, the processes may be executed regardless of whether or not the face authentication succeeds.

In the foregoing, the invention of the present application has been described with reference to the example embodiments; however, the invention of the present application is not limited to the above descriptions. Various changes understandable to a person skilled in the art may be applied to configurations and details of the invention of the present application within the scope of the invention.

A portion or all of the above-described example embodiments can be described as the following supplementary note but are not limited to the following.

(Supplementary Note 1)
A visit assistance device comprising:
a registration unit configured to register a status in a seated condition of a user who is seated in a predetermined space for each user; and
a display control unit configured to cause a display device installed in an entrance of the space to display the registered status of the user together with information identifying the user.

(Supplementary Note 2)
The visit assistance device according to Supplementary note 1, further comprising:
a visit destination acquisition unit configured to acquire a visit destination user of a visitor who arrives at the entrance of the space; and
a status specifying unit configured to specify the status which is registered while being associated with the visit destination user,
wherein the display control unit causes the display device to display the specified status about the visit destination user.

(Supplementary Note 3)
The visit assistance device according to Supplementary note 1 or 2, further comprising:
a first image acquisition unit configured to acquire a first photographed image as a photographed image of a visitor who arrives at the entrance by a photographing device which is installed in the entrance; and
a first authentication control unit configured to perform control so as to perform face authentication of the visitor based on the first photographed image,
wherein the display control unit causes the display device to display the status in a case where the face authentication of the visitor succeeds.

(Supplementary Note 4)
The visit assistance device according to Supplementary note 1 or 2, further comprising:
a first image acquisition unit configured to acquire a first photographed image as a photographed image of a visitor who arrives at the entrance by a photographing device which is installed in the entrance; and
a first authentication control unit configured to perform control so as to perform face authentication of the visitor based on the first photographed image, wherein
the registration unit registers a status for each kind of visitor for the same user, and
the display control unit causes the display device to display the status corresponding to the kind of visitor which is distinguished by a result of the face authentication of the visitor.

(Supplementary Note 5)
The visit assistance device according to any one of Supplementary notes 1 to 4, further comprising a seat position specifying unit configured to specify a seat position in which a user is seated in the space,
wherein the display control unit causes the display device to further display a map which indicates the seat position specified by the seat position specifying unit together with information identifying the user.

(Supplementary Note 6)
The visit assistance device according to Supplementary note 5, wherein the display control unit performs control such that as for display of the seat position, only a user who satisfies a predetermined condition among seated users is displayed.

(Supplementary Note 7)
The visit assistance device according to Supplementary note 6, wherein the display control unit performs control such that as for display of the seat position, only a user corresponding to the visit destination user among seated users is displayed.

(Supplementary Note 8)
The visit assistance device according to any one of Supplementary notes 1 to 7,
wherein the display control unit causes the display device to further display a schedule of the user, which is in advance stored, together with information identifying the user.

(Supplementary Note 9)
The visit assistance device according to any one of Supplementary notes 1 to 8, wherein
the display control unit causes the display device to further display a user interface image for accepting a visit appointment, and
the visit assistance device further includes a notification unit configured to perform a notification about a visit to a terminal device associated with the visit destination user in a case where an appointment of a visit is requested.

(Supplementary Note 10)
The visit assistance device according to Supplementary note 9,
wherein the notification includes personal information of a visitor.

(Supplementary Note 11)
The visit assistance device according to Supplementary note 9,
wherein the notification includes history information about a visit of a visitor.

(Supplementary Note 12)

The visit assistance device according to Supplementary note 9,
wherein the notification includes information indicating whether or not a visitor corresponds to a predetermined person.

(Supplementary Note 13)

The visit assistance device according to any one of Supplementary notes 9 to 12, wherein in a case where a response result to the notification is received from the terminal device, the display control unit causes the display device to display the response result.

(Supplementary Note 14)

The visit assistance device according to Supplementary note 2, further comprising:
a first image acquisition unit configured to acquire a first photographed image as a photographed image of the visitor who arrives at the entrance by a photographing device which is installed in the entrance; and
a first authentication control unit configured to perform control so as to perform face authentication of the visitor based on the first photographed image,
wherein the visit destination acquisition unit
specifies a participant who participates in a conference at the same date and time together with the visitor based on conference information which is in advance stored and includes a definition of a date and time when a conference is held and a participant in the conference in a case where the face authentication of the visitor succeeds and
acquires the specified participant as the visit destination user.

(Supplementary Note 15)

The visit assistance device according to any one of Supplementary notes 5 to 7, further comprising a second image acquisition unit configured to acquire a second photographed image as a photographed image in the space,
wherein the seat position specifying unit
searches for a face image of a user which is in advance stored from the second photographed image and
specifies the seat position of the user based on a position where the face image is searched for.

(Supplementary Note 16)

The visit assistance device according to any one of Supplementary notes 5 to 7, further comprising:
a third image acquisition unit configured to acquire a third photographed image as a photographed image of a user of a terminal device which is photographed by a camera of the terminal device whose installation position in the space is in advance defined; and
a second authentication control unit configured to perform control so as to perform face authentication of the user who uses the terminal device based on the third photographed image,
wherein in a case where the face authentication of the user who uses the terminal device succeeds, the seat position specifying unit specifies the installation position of the terminal device as the seat position of the user.

(Supplementary Note 17)

A visit assistance system comprising:
an information processing device configured to be installed in an entrance of a predetermined space; and
a visit assistance device configured to assist a visit to a user in the space,
wherein the visit assistance device includes
a registration unit configured to register a status in a seated condition of the user who is seated in the space for each user and
a display control unit configured to cause the information processing device to display the registered status of the user together with information identifying the user.

(Supplementary Note 18)

The visit assistance system according to Supplementary note 17, wherein
the visit assistance device further includes
a visit destination acquisition unit configured to acquire a visit destination user of a visitor who arrives at the entrance of the space and
a status specifying unit configured to specify the status which is registered while being associated with the visit destination user, and
the display control unit causes the information processing device to display the specified status about the visit destination user.

(Supplementary Note 19)

A visit assistance method comprising:
registering a status in a seated condition of a user who is seated in a predetermined space for each user; and
causing a display device installed in an entrance of the space to display the registered status of the user together with information identifying the user.

(Supplementary Note 20)

A non-transitory computer-readable medium configured to store a program causing a computer to execute:
a registration step of registering a status in a seated condition of a user who is seated in a predetermined space for each user; and
a display control step of causing a display device installed in an entrance of the space to display the registered status of the user together with information identifying the user.

REFERENCE SIGNS LIST 1, 100, 101, 102 VISIT ASSISTANCE DEVICE
2, 151, 240 REGISTRATION UNIT
3, 157 DISPLAY CONTROL UNIT
10, 11 VISIT ASSISTANCE SYSTEM
110, 121, 125, 330 STORAGE UNIT
152, 159 VISIT DESTINATION ACQUISITION UNIT
153, 160 IMAGE ACQUISITION UNIT
154, 162 SEAT POSITION SPECIFYING UNIT
155 STATUS SPECIFYING UNIT
156, 161 AUTHENTICATION CONTROL UNIT
158 NOTIFICATION UNIT
200 AUTHENTICATION DEVICE
210 FACE INFORMATION DB
220 FACE DETECTION UNIT
230 FEATURE POINT EXTRACTION UNIT
250 AUTHENTICATION UNIT
300 ENTRANCE TERMINAL
310 CAMERA
320 DISPLAY UNIT
351 PHOTOGRAPHING CONTROL UNIT
352 INPUT-OUTPUT CONTROL UNIT
400 TERMINAL DEVICE
401 CAMERA
500 CAMERA
600 NETWORK

The invention claimed is:

1. A system comprising:
an authentication device storing a face information database;
an entrance terminal disposed at an entrance of a space, the entrance terminal including an entrance camera configured to capture a face image of a visitor user and a display;
a space camera disposed within the space and configured to capture facial images of visit destination users when seated at a plurality of desks in the space;
a plurality of desk terminal devices disposed at the plurality of desks within the space for use by the visit destination users when seated at the plurality of desks;
a visit assistance device configured to:
receive the facial images of the visit destination users captured by the space camera;
identify the visit destination users when seated at the plurality of desks based on the facial images of the visit destination users and information stored in the face information database;
register a status for each visit destination user to indicate whether a visit destination user is seated and an associated desk, if any, the visit destination user is seated at;
receive, from the entrance terminal, the face image of the visitor user captured by the entrance camera;
identify the visitor user based on the face image of the visitor user and the information stored in the face information database;
determine, from among the visit destination users seated at the plurality of desks, a target visit destination user who has attended a conference with the visitor user;
transmit, to a desk terminal device at the desk at which the target visitor destination user is seated, the face image of the visitor user;
receive, from the desk terminal device, whether the target visit destination visit user is interested in receiving the visitor user;
when the target destination visit user is interested in receiving the visitor user, transmit a facial image of the target visit destination user to the entrance terminal for display to the visitor user on the display, and control a gate to open to permit the visitor user to enter the space to visit the target visit destination user; and
when the target destination visit user is not interested in receiving the visitor user, register the status for the target visit destination user to further indicate that the target visit destination user is not interested in receiving the visitor user, transmit the status of the target visit destination to the entrance terminal for display to the visitor user on the display, and do not control the gate to open to permit the visit user to enter the space.

2. A visit assistance method performed by a visit assistance device and comprising:
receiving facial images of visit destination users captured by a space camera disposed within a space and configured to capture the facial images of the visit destination users when seated at a plurality of desks in the space;
identifying the visit destination users when seated at the plurality of desks based on the facial images of the visit destination users and information stored by an authentication device in a face information database;
registering a status for each visit destination user to indicate whether a visit destination user is seated and an associated desk, if any, the visit destination user is seated at;
receiving, from an entrance terminal disposed at an entrance of the space, a face image of a visitor user captured by an entrance camera of the entrance terminal configured to capture the face image of the visitor user, and wherein the entrance terminal includes a display;
identifying the visitor user based on the face image of the visitor user and the information stored in the face information database;
determining, from among the visit destination users seated at the plurality of desks, a target visit destination user who has attended a conference with the visitor user;
transmitting, to a desk terminal device at the desk at which the target visitor destination user is seated, the face image of the visitor user, the desk terminal device being one of a plurality of desk terminal devices respectively disposed at the plurality of desks within the space for use by the visit destination users when seated at the plurality of desks;
receiving, from the desk terminal device, whether the target visit destination visit user is interested in receiving the visitor user;
when the target destination visit user is interested in receiving the visitor user, transmitting a facial image of the target visit destination user to the entrance terminal for display to the visitor user on the display of the entrance terminal, and controlling a gate to open to permit the visitor user to enter the space to visit the target visit destination user; and
when the target destination visit user is not interested in receiving the visitor user, registering the status for the target visit destination user to further indicate that the target visit destination user is not interested in receiving the visitor user, transmitting the status of the target visit destination to the entrance terminal for display to the visitor user on the display, and not controlling the pate to open to permit the visit user to enter the space.

3. A non-transitory computer-readable medium storing a program executable by a visit assistance device to perform processing comprising:
receiving facial images of visit destination users captured by a space camera disposed within a space and configured to capture the facial images of the visit destination users when seated at a plurality of desks in the space;
identifying the visit destination users when seated at the plurality of desks based on the facial images of the visit destination users and information stored by an authentication device in a face information database;
registering a status for each visit destination user to indicate whether a visit destination user is seated and an associated desk, if any, the visit destination user is seated at;
receiving, from an entrance terminal disposed at an entrance of the space, a face image of a visitor user captured by an entrance camera of the entrance terminal configured to capture the face image of the visitor user, and wherein the entrance terminal includes a display;
identifying the visitor user based on the face image of the visitor user and the information stored in the face information database;
determining, from among the visit destination users seated at the plurality of desks, a target visit destination user who has attended a conference with the visitor user;

transmitting, to a desk terminal device at a desk at which the target visitor destination user is seated, the face image of the visitor user, the desk terminal device being one of a plurality of desk terminal devices respectively disposed at the plurality of desks within the space for use by the visit destination users when seated at the plurality of desks;

receiving, from the desk terminal device, whether the target visit destination visit user is interested in receiving the visitor user;

when the target destination visit user is interested in receiving the visitor user, transmitting a facial image of the target visit destination user to the entrance terminal for display to the visitor user on the display of the entrance terminal, and controlling a gate to open to permit the visitor user to enter the space to visit the target visit destination user;

when the target destination visit user is not interested in receiving the visitor user, registering the status for the target visit destination user to further indicate that the target visit destination user is not interested in receiving the visitor user, transmitting the status of the target visit destination to the entrance terminal for display to the visitor user on the display, and not controlling the gate to open to permit the visit user to enter the space.

\* \* \* \* \*